US011290987B2

(12) United States Patent
Chen et al.

(10) Patent No.: US 11,290,987 B2
(45) Date of Patent: Mar. 29, 2022

(54) SLOT STRUCTURE LINKAGE IN WIRELESS SYSTEMS

(71) Applicant: QUALCOMM Incorporated, San Diego, CA (US)

(72) Inventors: Wanshi Chen, San Diego, CA (US); Heechoon Lee, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/052,968

(22) Filed: Aug. 2, 2018

(65) Prior Publication Data
US 2019/0045495 A1    Feb. 7, 2019

Related U.S. Application Data

(60) Provisional application No. 62/541,567, filed on Aug. 4, 2017.

(51) Int. Cl.
| | |
|---|---|
| *H04J 3/00* | (2006.01) |
| *H04W 72/04* | (2009.01) |
| *H04L 5/00* | (2006.01) |
| *H04L 5/14* | (2006.01) |

(52) U.S. Cl.
CPC ....... *H04W 72/0406* (2013.01); *H04L 5/0007* (2013.01); *H04L 5/0044* (2013.01);
(Continued)

(58) Field of Classification Search
None
See application file for complete search history.

(56) References Cited

U.S. PATENT DOCUMENTS

| | | | |
|---|---|---|---|
| 8,908,651 B2* | 12/2014 | Noh | ........ H04L 1/0083 370/335 |
| 2007/0177494 A1* | 8/2007 | Tomizawa | ........ H04L 5/023 370/208 |

(Continued)

OTHER PUBLICATIONS

3rd Generation Partnership Project; Technical Specification Group Radio Access Network; Study on New Radio Access Technology Physical Layer Aspects (Release 14), 3GPP Standard; Technical Report; 3GPP TR 38.802, 3rd Generation Partnership Project (3GPP), Mobile Competence Centre; 650, Route Des Lucioles; F-06921 Sophia-Antipolis Cedex; France, vol. RAN WG1, No. V14.1.0, Jun. 23, 2017, pp. 1-143, XP051299025, [retrieved on Jun. 23, 2017].
(Continued)

*Primary Examiner* — Gerald A Smarth
(74) *Attorney, Agent, or Firm* — Holland & Hart LLP

(57) ABSTRACT

Methods, systems, and devices for wireless communication are described. A base station and user equipment (UE) may utilize different slot structures for communications depending on the type of data to be transmitted. A base station may configure the slot structures based on a capability of a UE or operation conditions. The base station may identify a slot structure for a first slot, which may be group-specific or UE-specific, and determine a slot structure for a subsequent slot, which may be UE-specific or based on the slot structure of the first slot. A set of slot structure combinations may be identified to be used by a UE for combining the first and subsequent slots, and one combination may be selected based on a capability of the UE, an operation to be performed by the UE, an operational condition associated with the UE, or a combination thereof.

31 Claims, 18 Drawing Sheets

(52) U.S. Cl.
CPC .......... *H04L 5/0091* (2013.01); *H04L 5/1469* (2013.01); *H04W 72/042* (2013.01); *H04W 72/048* (2013.01); *H04W 72/0446* (2013.01)

(56) References Cited

U.S. PATENT DOCUMENTS

| | | | | |
|---|---|---|---|---|
| 2010/0135360 A1* | 6/2010 | Kwak | .................. | H04L 5/0007 375/135 |
| 2012/0320838 A1* | 12/2012 | Yang | ..................... | H04L 1/0061 370/329 |
| 2013/0010714 A1* | 1/2013 | Kim | ..................... | H04L 5/0092 370/329 |
| 2013/0088995 A1* | 4/2013 | Chun | .................. | H04B 7/0626 370/252 |
| 2014/0105152 A1* | 4/2014 | Wu | ......................... | H04L 5/001 370/329 |
| 2015/0092716 A1* | 4/2015 | Han | ..................... | H04L 5/0053 370/329 |
| 2015/0131566 A1* | 5/2015 | Seo | ..................... | H04B 1/3838 370/329 |
| 2015/0173059 A1* | 6/2015 | Park | ..................... | H04B 7/155 370/329 |
| 2015/0350944 A1* | 12/2015 | Chen | ..................... | H04L 43/065 370/252 |
| 2016/0013904 A1* | 1/2016 | Seo | ..................... | H04W 74/006 370/329 |
| 2016/0337023 A1* | 11/2016 | Yi | ......................... | H04L 5/0091 |
| 2017/0367046 A1* | 12/2017 | Papasakellariou | .... | H04L 5/0048 |
| 2018/0206250 A1* | 7/2018 | Lee | ..................... | H04L 5/0062 |
| 2019/0357224 A1* | 11/2019 | Li | ......................... | H04W 72/04 |

OTHER PUBLICATIONS

CATT: "[89-20] email discussion: Group-common PDCCH for NR," 3GPP Draft; R1-1710968, 3rd Generation Partnership Project (3GPP), Mobile Competence Centre; 650, Route Des Lucioles; F-06921 Sophia-Antipolis Cedex; France, vol. RAN WG1, No. Qingdao; Jun. 27, 2017-Jun. 30, 2017, Jun. 28, 2017, XP051305938, 22 pages, Retrieved from the Internet: URL:http://www.3gpp.org/ftp/tsg_ran/WG1_RL1/TSGR1_AH/NR_AH_1706/Docs/ [retrieved on Jun. 28, 2017].

International Search Report and Written Opinion—PCT/US2018/045197—ISA/EPO—dated Dec. 17, 2018.

NTT Docomo, et al., "Views on UE Behavior for Group-common PDCCH," 3GPP Draft; R1-1711096, 3rd Generation Partnership Project (3GPP), Mobile Competence Centre; 650, Route Des Lucioles; F06921 Sophia-Antipolis Cedex; France, vol. RAN WG1, No. Qingdao, P.R., China; Jun. 27, 2017-Jun. 30, 2017, Jun. 26, 2017, XP051300296, 3 pages, Retrieved from the Internet: URL:http://www.3gpp.org/ftp/Meetings_3GPP_SYNC/RAN1/Docs/ [retrieved on Jun. 26, 2017].

Partial International Search Report—PCT/US2018/045197—ISA/EPO—dated Oct. 19, 2018.

Wilus Inc: "Discussion on UE Behavior for Group-common PDCCH for NR," 3GPP Draft; R1-1711357_UE_Behavior for Group Common PDCHH_Final, 3rd Generation Partnership Project (3GPP), Mobile Competence Centre; 650, Route Des Lucioles; F-06921 Sophia-Antipolis Cedex; France, vol. RAN WG1, No. Qingdao; Jun. 27, 2017-Jun. 30, 2017, XP051300546, 5 pages, Retrieved from the Internet: URL:http://www..3gpp.org/ftp/Meetings_3GPP_SYNC/RAN1/Docs/ [retrieved on Jun. 26, 2017].

CATT: "Contents of the Group-Common PDCCH", 3GPP Draft, 3GPP TSG RAN WG1 Meeting #89, R1-1707501, Hangzhou, P. R. China, May 15-19, 2017, 4 Pages.

Panasonic: "Discussion on Resource Allocation for Uplink Control Channel", 3GPP Draft, 3GPP TSG RAN WG1 NR Ad-Hoc#2, R1-1710937, Qingdao, P.R. China, Jun. 27-30, 2017, pp. 1-3.

\* cited by examiner

SLOT STRUCTURE LINKAGE IN WIRELESS SYSTEMS

CROSS REFERENCES

The present Application for Patent claims priority to U.S. Provisional Patent Application No. 62/541,567 by Chen, et al., entitled "Slot Structure Linkage in Wireless Systems," filed Aug. 4, 2017, assigned to the assignee hereof and incorporated by reference herein in its entirety.

BACKGROUND

The following relates generally to wireless communication, and more specifically to slot structure linkage in wireless systems.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDMA (DFT-S-OFDMA). A wireless multiple-access communication system may include a number of base stations or network access nodes, each simultaneously supporting communication for multiple communication devices, which may be otherwise known as user equipment (UE).

In some wireless communication systems, a base station and UE may utilize different slot structures corresponding to the type of data to be transmitted (e.g., uplink or downlink data). The wireless communication system (e.g., NR) may support scalable numerology (15, 30, 60, 120 kHz, etc.) and variable slot durations (0.5, 0.25, 0.125 ms, etc.). Each slot structure may contain downlink control information, downlink data, uplink data, uplink control information, timing gaps (e.g., guard periods), or any combination thereof. Downlink and uplink slot structures may inefficiently allocate resources for data transmissions.

SUMMARY

The described techniques relate to improved methods, systems, devices, or apparatuses that support slot structure linkage in wireless systems. Generally, the described techniques provide for transmission of a group-specific signal and user equipment (UE)-specific signal related to a first slot structure of a first slot for communication between a UE and a base station. The group-specific signal and the UE-specific signal may be received by a UE and used to determine the first slot structure. The group-specific signal and the UE-specific signal also may be used by the UE to determine a second slot structure, which may be for one or more slots subsequent to the first slot, over which communications between the UE and the base station may also be performed. Further, a set of slot structure combinations may be identified to be used by a UE for combining the first and second slots, and one combination may be selected based on a capability of the UE, an operation to be performed by the UE, an operational condition associated with the UE, or a combination thereof.

In some examples, a UE may communicate with a base station using a modular channel. The modular channel may have an associated structure that is based on a nominal duration for the modular channel. For example, the structure of the modular channel may have a duration that is an integer multiple of the nominal duration. Further, in some cases, a base station may multiplex multiple modular channels for respective UEs within a set of physical resource blocks (PRBs). The base station may indicate, to one or more of the respective UEs, the modular channel, the modular channel structure, time-frequency resources corresponding to the modular channel, or any combination thereof. In some aspects, the modular channel may be a physical uplink control channel (PUCCH) or a physical uplink share channel (PUSCH), which may be used by the UE to transmit uplink messages (e.g., to the base station).

A method of wireless communication is described. The method may include receiving a group-specific signal including slot structure information to be used in communications with a base station, receiving a UE-specific signal including additional slot structure information, the UE-specific signal being based on the slot structure information of the group-specific signal, determining a first slot structure based at least in part the group-specific signal and the UE-specific signal, and communicating with the base station using the first slot structure for a first slot.

An apparatus for wireless communication is described. The apparatus may include a processor, memory in electronic communication with the processor, and instructions stored in the memory. The instructions may be executable by the processor to cause the apparatus to receive a group-specific signal including slot structure information to be used in communications with a base station, receive a UE-specific signal including additional slot structure information, the UE-specific signal being based on the slot structure information of the group-specific signal, determine a first slot structure based at least in part the group-specific signal and the UE-specific signal, and communicate with the base station using the first slot structure for a first slot.

Another apparatus for wireless communication is described. The apparatus may include means for receiving a group-specific signal including slot structure information to be used in communications with a base station, receiving a UE-specific signal including additional slot structure information, the UE-specific signal being based on the slot structure information of the group-specific signal, determining a first slot structure based at least in part the group-specific signal and the UE-specific signal, and communicating with the base station using the first slot structure for a first slot.

A non-transitory computer-readable medium storing code for wireless communication is described. The code may include instructions executable by a processor to receive a group-specific signal including slot structure information to be used in communications with a base station, receive a UE-specific signal including additional slot structure information, the UE-specific signal being based on the slot structure information of the group-specific signal, determine a first slot structure based at least in part the group-specific signal and the UE-specific signal, and communicate with the base station using the first slot structure for a first slot.

Some examples of the method, apparatuses, and non-transitory computer-readable medium described herein may further include operations, features, means, or instructions for determining a second slot structure based on the group-specific signal, the UE-specific signal, or combinations thereof and communicating with the base station using the second slot structure for a second slot subsequent to the first slot.

In some examples of the method, apparatuses, and non-transitory computer-readable medium described herein, the second slot structure indicates multiple slot structures for respective slots subsequent to the first slot.

Some examples of the method, apparatuses, and non-transitory computer-readable medium described herein may further include operations, features, means, or instructions for identifying a set of slot structure combinations available for use by a UE for the first slot and for a second slot, each combination having a downlink slot structure and an uplink slot structure and selecting, for the first slot and the second slot, one combination of the set of slot structure combinations.

In some examples of the method, apparatuses, and non-transitory computer-readable medium described herein, the one combination of the set of slot structure combinations may be selected based on a capability of the UE, an operation to be performed by the UE, an operational condition associated with the UE, or a combination thereof.

In some examples of the method, apparatuses, and non-transitory computer-readable medium described herein, the group-specific signal may be a group-specific PDCCH.

In some examples of the method, apparatuses, and non-transitory computer-readable medium described herein, the UE-specific signal may be a UE-specific PDCCH.

In some examples of the method, apparatuses, and non-transitory computer-readable medium described herein, the UE-specific signal may be dynamically or semi-statically received.

In some examples of the method, apparatuses, and non-transitory computer-readable medium described herein, determining the first slot structure may include operations, features, means, or instructions for determining a default slot structure for the first slot.

Some examples of the method, apparatuses, and non-transitory computer-readable medium described herein may further include operations, features, means, or instructions for identifying a nominal slot structure for a sequence of slots.

In some examples of the method, apparatuses, and non-transitory computer-readable medium described herein, each of the first and second slot structures include an uplink portion, a downlink portion, and a guard period portion.

In some examples of the method, apparatuses, and non-transitory computer-readable medium described herein, each of the first slot structure for the first slot and a second slot structure for a subsequent second slot may be compatible with the nominal slot structure.

A method of wireless communication is described. The method may include transmitting a group-specific signal including slot structure information to be used in communications with a UE, transmitting a UE-specific signal including additional slot structure information the UE-specific signal being based on the slot structure information of the group-specific signal, and communicating with the UE using a first slot structure over a first slot, the first slot structure being based at least in part the group-specific signal and the UE-specific signal.

An apparatus for wireless communication is described. The apparatus may include a processor, memory in electronic communication with the processor, and instructions stored in the memory. The instructions may be executable by the processor to cause the apparatus to transmit a group-specific signal including slot structure information to be used in communications with a UE, transmit a UE-specific signal including additional slot structure information the UE-specific signal being based on the slot structure information of the group-specific signal, and communicate with the UE using a first slot structure over a first slot, the first slot structure being based at least in part the group-specific signal and the UE-specific signal.

Another apparatus for wireless communication is described. The apparatus may include means for transmitting a group-specific signal including slot structure information to be used in communications with a UE, transmitting a UE-specific signal including additional slot structure information the UE-specific signal being based on the slot structure information of the group-specific signal, and communicating with the UE using a first slot structure over a first slot, the first slot structure being based at least in part the group-specific signal and the UE-specific signal.

A non-transitory computer-readable medium storing code for wireless communication is described. The code may include instructions executable by a processor to transmit a group-specific signal including slot structure information to be used in communications with a UE, transmit a UE-specific signal including additional slot structure information the UE-specific signal being based on the slot structure information of the group-specific signal, and communicate with the UE using a first slot structure over a first slot, the first slot structure being based at least in part the group-specific signal and the UE-specific signal.

Some examples of the method, apparatuses, and non-transitory computer-readable medium described herein may further include operations, features, means, or instructions for communicating with the UE using a second slot structure for a second slot subsequent to the first slot, the second slot structure based on the group-specific signal and the UE-specific signal.

In some examples of the method, apparatuses, and non-transitory computer-readable medium described herein, the UE-specific signal indicates a set of slot structure combinations available for use by the UE.

In some examples of the method, apparatuses, and non-transitory computer-readable medium described herein, the second slot structure may be based on the set of slot structure combinations.

In some examples of the method, apparatuses, and non-transitory computer-readable medium described herein, the second slot structure may be based on a capability of the UE, an operation to be performed by the UE, an operational condition associated with the UE, or a combination thereof.

In some examples of the method, apparatuses, and non-transitory computer-readable medium described herein, the second slot structure indicates multiple slot structures for respective slots subsequent to the first slot.

Some examples of the method, apparatuses, and non-transitory computer-readable medium described herein may further include operations, features, means, or instructions for determining a default slot structure for the first slot, where the group-specific signal indicates the default slot structure.

In some examples of the method, apparatuses, and non-transitory computer-readable medium described herein, the group-specific signal indicates the first slot structure for a set of UEs including the UE.

Some examples of the method, apparatuses, and non-transitory computer-readable medium described herein may further include operations, features, means, or instructions for identifying a nominal slot structure for a sequence of slots.

In some examples of the method, apparatuses, and non-transitory computer-readable medium described herein, each of the first slot structure for the first slot and a second slot structure for a subsequent second slot may be compatible with the nominal slot structure.

In some examples of the method, apparatuses, and non-transitory computer-readable medium described herein, each of the first and second slot structures include an uplink portion, a downlink portion, and a guard period portion.

In some examples of the method, apparatuses, and non-transitory computer-readable medium described herein, the UE-specific signal may be dynamically or semi-statically transmitted.

A method of wireless communication is described. The method may include determining a slot structure for communicating with at least one UE during a slot, the slot structure being based at least on a group-specific signal, identifying a channel duration for a modular channel, the channel duration based on the slot structure, the modular channel including time-frequency resources for a set of symbols within the slot, determining, for the at least one UE, a channel structure for the modular channel based on the channel duration, and transmitting, to the at least one UE, the group-specific signal and an indication of the channel structure.

An apparatus for wireless communication is described. The apparatus may include a processor, memory in electronic communication with the processor, and instructions stored in the memory. The instructions may be executable by the processor to cause the apparatus to determine a slot structure for communicating with at least one UE during a slot, the slot structure being based at least on a group-specific signal, identify a channel duration for a modular channel, the channel duration based on the slot structure, the modular channel including time-frequency resources for a set of symbols within the slot, determine, for the at least one UE, a channel structure for the modular channel based on the channel duration, and transmit, to the at least one UE, the group-specific signal and an indication of the channel structure.

Another apparatus for wireless communication is described. The apparatus may include means for determining a slot structure for communicating with at least one UE during a slot, the slot structure being based at least on a group-specific signal, identifying a channel duration for a modular channel, the channel duration based on the slot structure, the modular channel including time-frequency resources for a set of symbols within the slot, determining, for the at least one UE, a channel structure for the modular channel based on the channel duration, and transmitting, to the at least one UE, the group-specific signal and an indication of the channel structure.

A non-transitory computer-readable medium storing code for wireless communication is described. The code may include instructions executable by a processor to determine a slot structure for communicating with at least one UE during a slot, the slot structure being based at least on a group-specific signal, identify a channel duration for a modular channel, the channel duration based on the slot structure, the modular channel including time-frequency resources for a set of symbols within the slot, determine, for the at least one UE, a channel structure for the modular channel based on the channel duration, and transmit, to the at least one UE, the group-specific signal and an indication of the channel structure.

In some examples of the method, apparatuses, and non-transitory computer-readable medium described herein, the slot structure may be based at least on a UE-specific signal.

Some examples of the method, apparatuses, and non-transitory computer-readable medium described herein may further include operations, features, means, or instructions for transmitting, to the at least one UE, the UE-specific signal.

Some examples of the method, apparatuses, and non-transitory computer-readable medium described herein may further include operations, features, means, or instructions for multiplexing a set of channels in the slot based on the channel duration.

In some examples of the method, apparatuses, and non-transitory computer-readable medium described herein, each of the set of channels corresponds to a respective UE.

In some examples of the method, apparatuses, and non-transitory computer-readable medium described herein, at least two of the set of channels may be multiplexed across different physical resource blocks.

Some examples of the method, apparatuses, and non-transitory computer-readable medium described herein may further include operations, features, means, or instructions for multiplexing a set of channels in the slot based on the channel duration.

In some examples of the method, apparatuses, and non-transitory computer-readable medium described herein, each of the set of channels corresponds to a respective UE.

In some examples of the method, apparatuses, and non-transitory computer-readable medium described herein, a first channel of the set of channels may have an interval duration different from an interval duration of a second channel of the set of channels.

In some examples of the method, apparatuses, and non-transitory computer-readable medium described herein, the interval duration of the second channel may be an integer multiple of the interval duration of the first channel.

Some examples of the method, apparatuses, and non-transitory computer-readable medium described herein may further include operations, features, means, or instructions for receiving, from the at least one UE, a channel message in accordance with the channel structure.

In some examples of the method, apparatuses, and non-transitory computer-readable medium described herein, the modular channel may be a modular PUCCH, the channel duration may be a PUCCH duration, and the channel message may be a PUCCH message.

In some examples of the method, apparatuses, and non-transitory computer-readable medium described herein, the modular channel may be a modular PUSCH for modular-based multiple user multiple-input/multiple-output (MU-MIMO) operation, the channel duration may be a PUSCH duration, and the channel message may be a PUSCH message.

A method of wireless communication is described. The method may include receiving, by a UE, a group-specific signal including slot structure information to be used in communications with a base station, determining, by the UE, a slot structure for communicating with a base station during a slot, the slot structure being based at least on a group-specific signal, identifying a channel duration for a modular channel, the channel duration being based on the slot structure, the modular channel including time-frequency resources for a set of symbols within the slot, determining, by the UE, a channel structure for the modular channel based on the channel duration, and transmitting, to the base station, an uplink message using the modular channel according to the channel structure.

An apparatus for wireless communication is described. The apparatus may include a processor, memory in electronic communication with the processor, and instructions stored in the memory. The instructions may be executable by the processor to cause the apparatus to receive, by a UE, a group-specific signal including slot structure information to be used in communications with a base station, determine, by the UE, a slot structure for communicating with a base station during a slot, the slot structure being based at least on a group-specific signal, identify a channel duration for a modular channel, the channel duration being based on the slot structure, the modular channel including time-frequency resources for a set of symbols within the slot, determine, by the UE, a channel structure for the modular channel based on the channel duration, and transmit, to the base station, an uplink message using the modular channel according to the channel structure.

Another apparatus for wireless communication is described. The apparatus may include means for receiving, by a UE, a group-specific signal including slot structure information to be used in communications with a base station, determining, by the UE, a slot structure for communicating with a base station during a slot, the slot structure being based at least on a group-specific signal, identifying a channel duration for a modular channel, the channel duration being based on the slot structure, the modular channel including time-frequency resources for a set of symbols within the slot, determining, by the UE, a channel structure for the modular channel based on the channel duration, and transmitting, to the base station, an uplink message using the modular channel according to the channel structure.

A non-transitory computer-readable medium storing code for wireless communication is described. The code may include instructions executable by a processor to receive, by a UE, a group-specific signal including slot structure information to be used in communications with a base station, determine, by the UE, a slot structure for communicating with a base station during a slot, the slot structure being based at least on a group-specific signal, identify a channel duration for a modular channel, the channel duration being based on the slot structure, the modular channel including time-frequency resources for a set of symbols within the slot, determine, by the UE, a channel structure for the modular channel based on the channel duration, and transmit, to the base station, an uplink message using the modular channel according to the channel structure.

In some examples of the method, apparatuses, and non-transitory computer-readable medium described herein, the slot structure may be based at least on a UE-specific signal.

Some examples of the method, apparatuses, and non-transitory computer-readable medium described herein may further include operations, features, means, or instructions for receiving, from the base station, the UE-specific signal.

In some examples of the method, apparatuses, and non-transitory computer-readable medium described herein, the modular channel may be a modular PUCCH and the channel duration may be a PUCCH duration.

In some examples of the method, apparatuses, and non-transitory computer-readable medium described herein, the modular channel may be a modular PUSCH for modular-based multiple user multiple-input/multiple-output (MU-MIMO) operation and the channel duration may be a PUSCH duration.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

A base station and user equipment (UE) may utilize different slot structures for communications depending on the type of data to be transmitted. The wireless communication system (e.g., New Radio (NR)) may support scalable numerology (15, 30, 60, 120 kHz, etc.) and variable slot durations (0.5, 0.25, 0.125 ms, etc.). Each slot structure may contain downlink control information, downlink data, uplink data, uplink control information, timing gaps (e.g., guard periods), or any combination thereof. In some cases, the traffic conditions for a UE 115 may be bursty (e.g., downlink-heavy or uplink-heavy at certain times or over certain frequencies) or the channel conditions for the UE 115 may change over time (e.g., from the edge of the cell to the center of the cell). Additionally, a set of UEs 115 that are scheduled at a cell may change over time, and the slot structure for downlink or for uplink (e.g., the usage of physical uplink control channel (PUCCH) formats and physical uplink shared channel (PUSCH) formats) may change over time.

Some wireless communication systems may support UE-specific downlink-centric and uplink-centric slot structures for efficient resource management. A base station may configure the slot structures based on a capability of a UE or operation conditions. The capability of the UE may include whether the UE operates in full-duplex or half-duplex, whether hybrid automatic repeat request (HARQ) response is performed for a same slot or across slots, or the number of symbols for a HARQ response, etc. The operation conditions may include whether same packet sizes are utilized, same uplink timing advance/propagation delays are utilized, etc. The base station may identify a slot structure for a first slot (e.g., slot n), which may be group-specific or UE-specific, and determine a slot structure for a subsequent slot (e.g., slot n+1 or other subsequent slot), which may be UE-specific or based on the slot structure of the first slot.

Aspects of the disclosure are initially described in the context of wireless communication systems. Slot structure combinations and a modular channel structure are then described. Aspects of the disclosure are further illustrated by and described with reference to apparatus diagrams, system diagrams, and flowcharts that relate to slot structure linkage in wireless systems.

Figure 1:
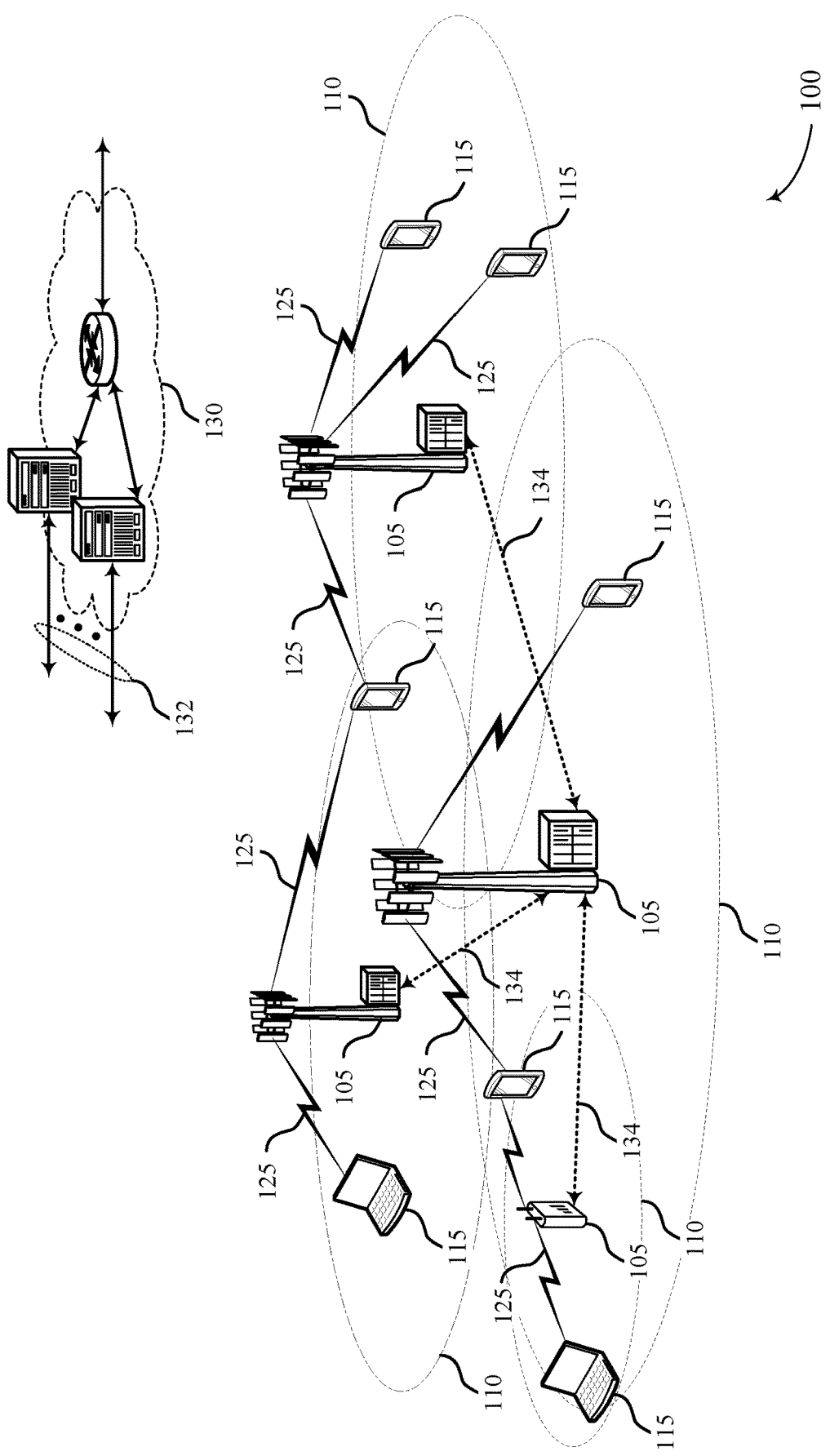
FIG. 1 illustrates an example of a system for wireless communication that supports slot structure linkage in wireless systems in accordance with aspects of the present disclosure.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a Long Term Evolution (LTE) network, an LTE-Advanced (LTE-A) network, or an NR network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communication resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 or UEs that can support simultaneous communications via carriers associated with more than one different carrier bandwidth.

Wireless communication system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless communication systems (e.g., NR and LTE), half-duplex UEs 115 may be supported. Half-duplex UEs 115 may transmit uplink data or receive downlink data at separate times or over separate resources and not support simultaneous uplink and downlink transmissions. For example, half-duplex UEs 115 may be supported in a transparent or scheduled manner (e.g., in LTE TDD). In such cases, a half-duplex UE 115 may determine some subframes as uplink subframes (e.g., RRC configured periodic channel state information (P-CSI) subframes or a downlink or uplink grant driven uplink transmission) and monitors downlink subframes otherwise. Additionally or alternatively, TDD communications may support half-duplex UEs 115 (e.g., in LTE TDD). For example, the half-duplex UEs 115 may utilize guard periods in a frame to facilitate downlink to uplink or uplink to downlink transitions.

In some cases, half-duplex UEs 115 may be explicitly supported (e.g., in LTE CA). For example, a half-duplex UE 115 may determine a subframe direction based on a primary cell (PCell) subframe configuration, which may impact channel state information (CSI) measurement subframe validity definition, enhanced physical downlink control channel (ePDCCH) monitoring definition, etc. In some cases, multiple cells with different uplink-downlink configurations in the a current radio frame may be aggregated, and the half-duplex UE 115 may not be capable of simultaneous reception and transmission in the aggregated cells. In such cases, if the subframe in the PCell is a downlink subframe, the half-duplex UE 115 may not transmit any signal or channel on a secondary cell (SCell) in the same subframe. Additionally or alternatively, if the subframe in the PCell is an uplink subframe, the half-duplex UE 115 may not be expected to receive downlink transmissions on an SCell in the same subframe. In some cases, if the subframe in the PCell is a special subframe and the same subframe in an SCell is a downlink subframe, the half-duplex UE 115 may not be expected to receive physical downlink shared channel (PDSCH)/ePDCCH/physical multicast channel (PMCH)/position reference signal (PRS) transmissions in the SCell in the same subframe, and the half-duplex UE 115 may not be expected to receive other signals on the SCell in OFDM symbols that overlap with the guard period or uplink pilot time slot (UpPTS) in the PCell.

Additionally, certain UEs 115 may explicitly support half-duplex operations (e.g., enhanced MTC (eMTC) or NB-IoT UEs 115). For example, guard periods (in units of symbols or subframes) and collision handling (e.g., two adjacent transmissions in different directions or different subbands) may be defined to facilitate switching and radio frequency (RF) retuning from one subband to another. In some cases, NR communications may support half-duplex UEs 115.

Some wireless communication systems (e.g., NR) may support variable slot structures. In some cases, the variable slot structures may include a scalable numerology (15, 30, 60, 120 kHz, etc.), variable slot durations (0.5, 0.25, 0.125 ms, etc.), and a different number of symbols (e.g., 7 or 14 symbols). Each slot may contain downlink control information, downlink data (e.g., physical downlink control channel (PDCCH) or PDSCH), uplink data (e.g., PUCCH or PUSCH), uplink control information, guard periods, or a combination thereof. In some cases, the uplink data may include PUCCH transmissions with different formats. For example, the PUCCH transmissions may include short PUCCH and long PUCCH. Short PUCCH may be 1 or 2 symbols and placed in the last symbol(s) of a slot. Alternatively, long PUCCH may have a range of 4 to 12 symbols. In some cases, the long PUCCH may be located in the middle of a slot or carry across multiple slots. Additionally, the location of a specific PUCCH format may be different for different UEs 115. For example, a 4-symbol PUCCH may be located in a first set of symbols (e.g., symbols 3-7) for a first UE 115 and may be located in a second set of symbols (e.g., symbols 8-11) for a second UE 115. The different PUCCH formats may be enabled for different UEs 115 or in different occasions for a UE 115 depending on scheduling considerations.

In some cases, the traffic conditions for a UE 115 may be bursty (e.g., downlink-heavy or uplink-heavy) or the channel conditions for the UE 115 may change over time (e.g., from the edge of the cell to the center of the cell). Additionally, a set of UEs 115 that are scheduled at a cell may change over time, and the slot structure for downlink or for uplink (e.g., the usage of PUCCH formats and PUSCH formats) may change over time.

Wireless communication system 100 may support UE-specific downlink-centric and uplink-centric slot structures for efficient resource management. A base station 105 may configure the slot structures based on a capability of a UE 115 or operation conditions. The capability of the UE 115 may include whether the UE 115 operates in full-duplex or half-duplex, whether HARQ response is performed for same-slot or across-slot, or the number of symbols for a HARQ response, etc. The operation conditions may include whether same packet sizes are utilized, same uplink timing advance/propagation delays are utilized, etc. The base station 105 may identify a slot structure for a first slot (e.g., slot n), which may be group-specific or UE-specific, and determine a slot structure for a subsequent slot (e.g., slot n+1 or other subsequent slot), which may be UE-specific based on the slot structure of the first slot.

Further, a base station 105 and a UE 115 may support communication via a modular channel. The modular channel may have an associated structure that is based on a nominal duration for the modular channel. In some examples, a base station 105 (or other network entity) may multiplex multiple channels for respective UEs across one or more physical resource blocks (PRBs) within the modular channel. An indication of the modular channel or an associated structure may be indicated to a UE 115 (e.g., via a downlink message from the base station 105). In some aspects, the modular channel may be a PUCCH or a PUSCH, which may be used by a UE 115 for transmission of uplink messages to a base station 105.

Figure 2:
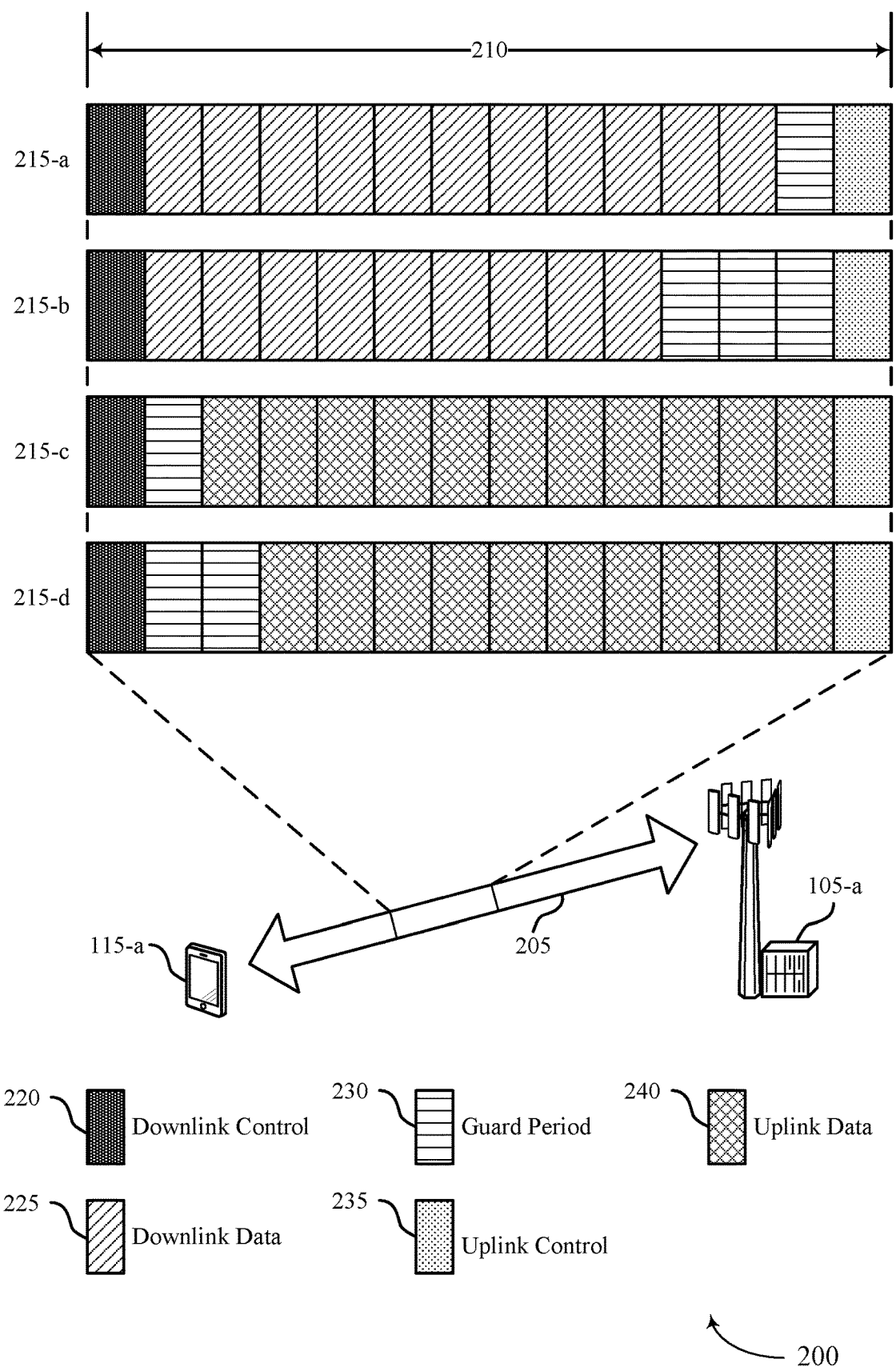
FIG. 2 illustrates an example of a wireless communication system that supports slot structure linkage in wireless systems in accordance with aspects of the present disclosure.

FIG. 2 illustrates an example of a wireless communication system 200 that supports slot structure linkage in wireless systems in accordance with various aspects of the present disclosure. In some examples, wireless communication system 200 may implement aspects of wireless communication system 100. Wireless communication system 200 may include a base station 105-*a* and a UE 115-*a*, which may be examples of corresponding base stations 105 and UEs 115 as described with reference to FIG. 1. In some cases, UE 115-*a* may operate in a half-duplex mode, as described with reference to FIG. 1. UE 115-*a* and base station 105-*a* may communicate on resources of carrier 205. Wireless communication system 200 may illustrate different slot structures 215 for a slot 210 for uplink or downlink transmissions. Base station 105-*a* may signal a slot structure 215 to UE 115-*a* for uplink or downlink communications.

The slot structures 215 may include symbols designated for downlink control 220, downlink data 225, guard periods 230, uplink control 235, and uplink data 240. While each slot structure 215 includes 14 symbols as depicted, the number of symbols may vary (e.g., 7 symbols). Further, the number of symbols utilized for each type may vary. For example, uplink control 235 may utilize one or two of the last symbols for each slot structure 215.

Slot structure 215-*a* may illustrate an example of a downlink-centric slot with a number of slots utilized for downlink data 225 and one symbol utilized for a guard period 230. Additionally, slot structure 215-*b* may illustrate another example of a downlink-centric slot, but with three symbols utilized for guard periods 230. Alternatively, slot structure 215-*c* may illustrate an example of an uplink-centric slot with a number of symbols utilized for uplink data 240 and with one symbol utilized for a guard period 230. Similarly, slot structure 215-*d* may illustrate an example of another uplink-centric slot, but with two symbols utilized for guard periods 230. The number of symbols utilized for guard periods 230 may vary in order to accommodate a transition between uplink and downlink transmissions. For example, a longer guard period (e.g., more guard periods 230) may be utilized the farther away UE 115-*a* is from base station 105-*a*.

Guard periods 230 may be utilized for different purposes such as uplink timing advances, processing times, or transmission/reception and reception/transmission switching times. For example, base station 105-*a* may indicate an uplink timing advance to UE 115-*a* for uplink transmission(s) (e.g., uplink data 240) with respect to a received downlink timing in order to ensure the same uplink receive timing at base station 105-*a*. The farther away UE 115-*a* is from base station 105-*a* may result in longer radio propagation delays and a longer uplink timing advance. Additionally, UE 115-*a* may need a processing time for downlink receptions to uplink transmissions. For example, UE 115-*a* may need the processing time from receiving PDSCH (e.g., downlink data 225) to providing HARQ response uplink transmissions (e.g., uplink data 240) or from receiving uplink grants in downlink control 220 to providing PUSCH transmissions (e.g., uplink data 240). The processing time may depend on the capability of UE 115-*a*. Additionally or alternatively, UE 115-*a* may utilize guard periods 230 to allow necessary time to switch from reception to transmission (e.g., downlink to uplink) or from transmission to reception (e.g., uplink to downlink). Guard periods 230 may be cell-specific, UE group-specific, or UE-specific. In some cases, cell-specific guard period management may be simpler, but may be less efficient than UE-specific guard period management.

Base station 105-*a* may identify a slot structure 215 for slot 210 and transmit the identified structure to UE 115-*a* (e.g., through RRC signaling or with additional bits in downlink control information (DCI) transmissions), which may be specific to UE 115-*a* or group-specific. Base station 105-*a* may then determine a slot structure 215 for one or more subsequent slots after slot 210 based on the slot structure 215 of slot 210. Additionally, the determination may be based on certain restrictions specifically to UE 115-*a* (e.g., based on the capabilities of UE 115-*a*). For example, for a given capability of UE 115-*a*, base station 105-*a* may identify a set of possible combinations of downlink and uplink structures between slot 210 and subsequent slots. In some cases, for different UE capabilities, the set of possible combinations may be different. Additionally or alternatively, the set of possible combinations may be defined differently for downlink operation (e.g., from PDSCH to HARQ response) and for uplink operation (e.g., from uplink grants to PUSCH transmissions). The combination downlink and uplink structure (e.g., linkage) for a particular schedule (e.g., downlink or uplink scheduling) may be determined based on semi-static or dynamic indication from the set of possible combinations. The location or duration of guard periods 230 for slot 210 and for the subsequent slots can be specific to UE 115-*a* and jointly managed. In some cases, UE 115-*a* may signal an indication for a slot structure 215 based on channel conditions (e.g., UE 115-*a* may request more symbols for uplink data 240).

Figure 3:
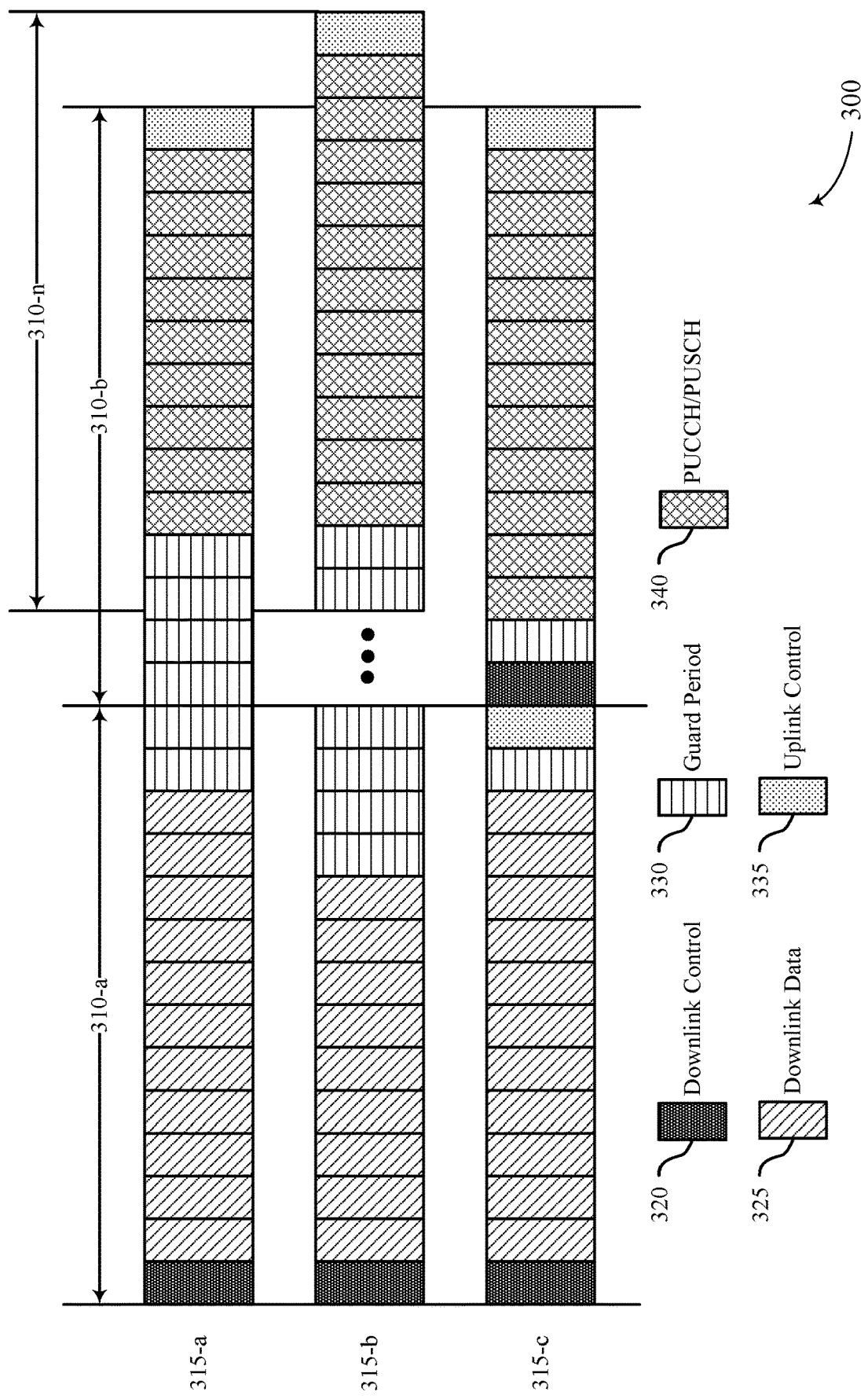
FIG. 3 illustrates an example of slot structure combinations that support slot structure linkage in wireless systems in accordance with aspects of the present disclosure.

FIG. 3 illustrates an example of slot structure linkages 300 that supports slot structure linkage in wireless systems in accordance with various aspects of the present disclosure. In some examples, slot structure linkages 300 may implement aspects of wireless communication systems 100 and 200 as described with reference to FIGS. 1 and 2. Slot structure linkages 300 may be utilized between a base station 105 and a UE 115, as described with reference to FIGS. 1 and 2, where the UE 115 operates in a half-duplex mode. Slot structure linkages 300 may include structures 315 that consist of a first slot structure for a first slot 310-*a* and subsequent slot structures for a second slot 310-*b* or a further subsequent slot 310-*n*. Each structure 315 may include downlink control 320, downlink data 325, guard period 330, uplink control 335, and PUCCH/PUSCH 340 (e.g., uplink control or uplink data), similar to the slot structures described with reference to FIG. 2.

As described with reference to FIG. 2, a base station 105 may identify a first slot structure for slot 310-*a* and then determine a slot structure for subsequent slots 310-*b* or 310-*n* for communication with a UE 115. The base station 105 may signal the first slot structure and the second slot structure to the UE 115 through various signaling (e.g., via two indicators or messages). For example, a first indicator may include a group PUCCH signal for a first slot structure in slot 310-*a*. Additionally, a second indicator may include a capability for the UE 115, may also be signaled to the UE 115 (through RRC, DCI, etc.). In some cases, the second indicator may be dynamically or semi-statically transmitted. The UE 115 may determine the slot structures based on the received indicators. In some examples, the base station 105 may further indicate how to combine the first slot structure and the second slot structure to the UE 115 (e.g., utilizing 2-bits).

Structures 315 may indicate how a downlink structure and uplink structure may be combined or linked together, which may be specific to different UEs 115. For example, based on the slot structure indicated for slot 310-a by a group common PDCCH (e.g., downlink control 320) and a UE-specific configuration, a first UE 115 may determine a first linkage or combination of a slot structure in slot 310-a and a slot structure in slot 310-b or slot 310-n, while a second UE 115 may determine a second combination of a slot structure in slot 310-a and a slot structure in slot 310-b or slot 310-n. Additionally, in case of no reception of the group common PDCCH, the first UE 115 may determine a first default slot structure for slot 310-a and the second UE 115 may determine a second default slot structure for slot 310-a. The determination of the default slot structure may be configurable on a per UE basis. As noted above with respect to FIG. 2, a UE 115 may signal an indication for the slot structure and combination based on channel conditions.

To determine slot structures within a subframe and a frame, each UE 115 may receive a broadcast signaling that describes some aspects how the cell will operate. Each UE 115 may also receive a group-common PDCCH. The group common PDCCH may inform each UE 115 to monitor for a PDDCH format indicator with some periodicity. For example, the group common PDDCH may inform each UE 115 to monitor ever slot, every two slots, every four slots, etc. In some cases, group common PDCCH may be scrambled by the base station 105 based on various types or categories of radio network temporary identifier (RNTI). A UE 115 may receive specific portions of the scrambled group common PDCCH. In this context, the group common PDCCH may be group specific or UE specific. In some examples, the group-specific PDCCH may include a slot structure and configuration for a single slot or a contiguous series of slots and subframes in a frame. The UE-specific PDCCH (or other UE-specific signaling) may override or adapt the slot structure for a particular UE 115 for one or more slots. For example, the one or more slots within the contiguous series of slots designated by the group-specific PDCCH may be overridden or adapted by the UE-specific PDCCH. In some examples, the UE-specific signaling, such as the UE-specific PDCCH may be transmitted by the base station 105 separately from the group-specific PDCCH (or other group-specific signaling).

Additionally, when a base station 105 schedule a particular UE 115, the base station 105 may indicate to the UE 115 a starting point of either the downlink/uplink data and a duration for the associated transmission. In this manner, the base station 105 may assign a subset of the symbols available in the slot structure communicated to the particular UE 115 to provide differentiation with respect to other UEs 115 utilizing the same slot structure (e.g., to account to account for a guard period, available processing power, a distance from a cell of the base station 105, or channel conditions associated with that particular UE 115).

Structure 315-a may illustrate a more efficient linkage for downlink-heavy operation (or a downlink-centric slot structure), where uplink transmissions may live with a shorter duration (e.g., cell-center UEs 115). Structure 315-b may illustrate a linkage more suitable for uplink-budget limited UEs 115 (e.g., an uplink-centric slot structure). Structure 315-c may illustrate a nominal structure linkage, which may be compatible for both structures 315-a and 315-b. Additionally, structure 315-c may be utilized for other UEs 115.

In some cases, depending on the UE capability, a UE 115 may or may not perform related operation in uplink control symbol(s) at the end of slot 310-a or in downlink control symbol(s) at the beginning of subsequent slots (e.g., slot 310-b or slot 310-n).

While the depicted structures 315 show both downlink data 325 and PUCCH/PUSCH 340 (e.g., uplink control or uplink data) in each, each structure 315 may include one of either downlink data 325 or PUCCH/PUSCH 340. Additionally, downlink control 320 and uplink control 335 may utilize one or two symbols within each structure 315.

Figure 4:
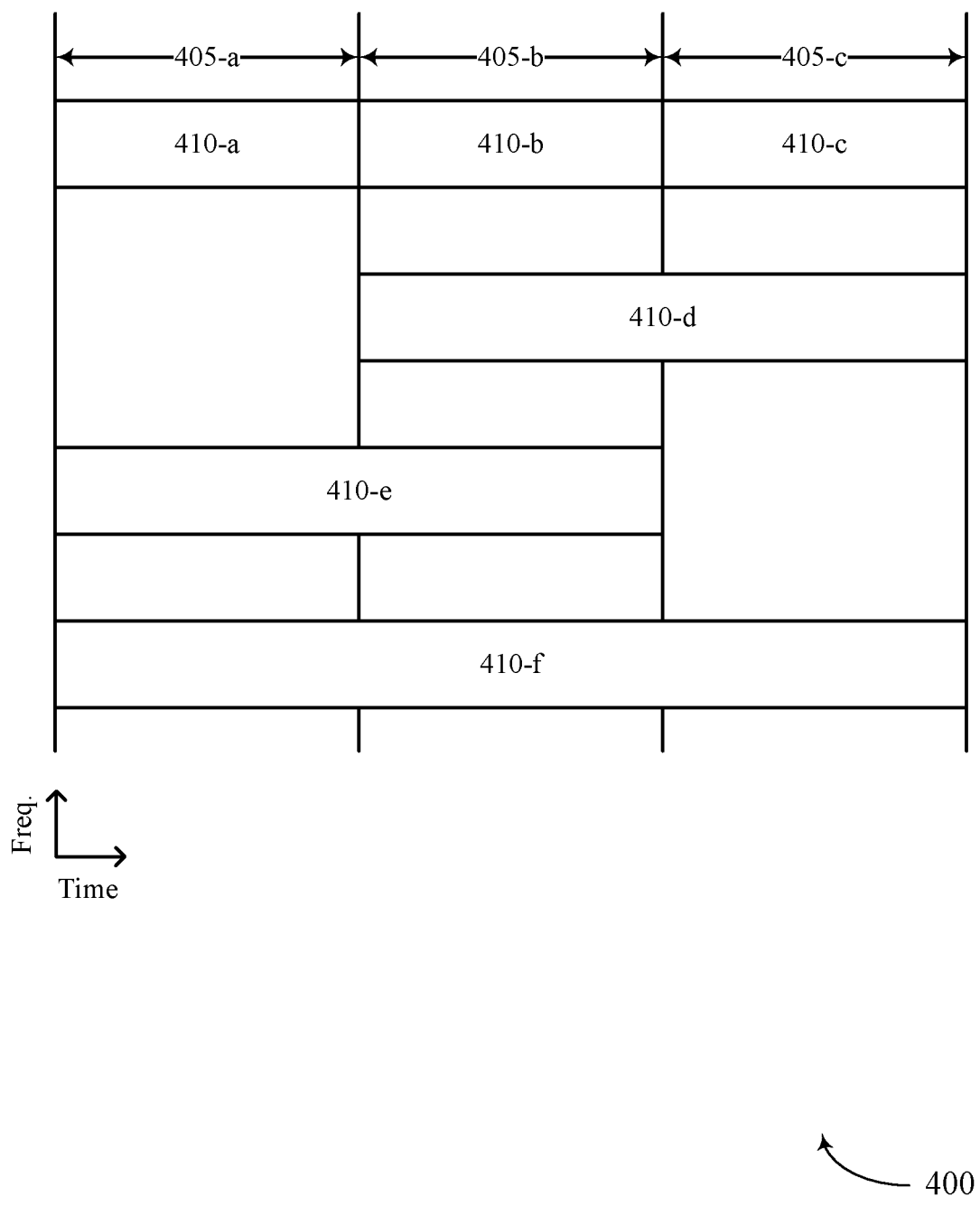
FIG. 4 illustrates an example of a modular channel structure that supports slot structure linkage in wireless systems in accordance with aspects of the present disclosure.

FIG. 4 illustrates an example of a modular channel structure 400 that supports slot structure linkage in wireless systems in accordance with various aspects of the present disclosure. In some examples, modular channel structure 400 may implement aspects of wireless communication system 100 and 200 as described with reference to FIGS. 1 and 2. Modular channel structure 400 may illustrate techniques for defining structures for channels 410 based on a nominal duration represented by intervals 405. In some examples, channels 410 may be one of a PUCCH channel or a PUSCH channel (e.g., in a modular-based MU-MIMO operation and may each be allocated for a respective UE 115).

In some cases, channels 410 of different durations may be multiplexed in the same slot in different PRBs (e.g., to ensure orthogonality). Alternatively, channels 410 of different durations may be multiplexed in the same PRB (e.g., to achieve more efficient operation for each interval 405-a, 405-b, and 405-c). In some cases, each interval 405 of length-N may be orthogonal to each other (e.g., intervals 405-a, 405-b, and 405-c may utilize different resources). Each interval 405 may have a length-N (e.g., 4 symbols), which may be defined for all intervals 405 (e.g., based on a nominal duration), and channels 410 of different lengths may be determined based on the length-N. For example, channels 410-a, 410-b, and 410-c may have a length of N; channels 410-d and 410-e may have a length of 2N; and channel 410-f may have a length of 3N. In this manner, each of the channels 410 may be an integer multiple of a duration of one of the intervals 405.

Figure 5:
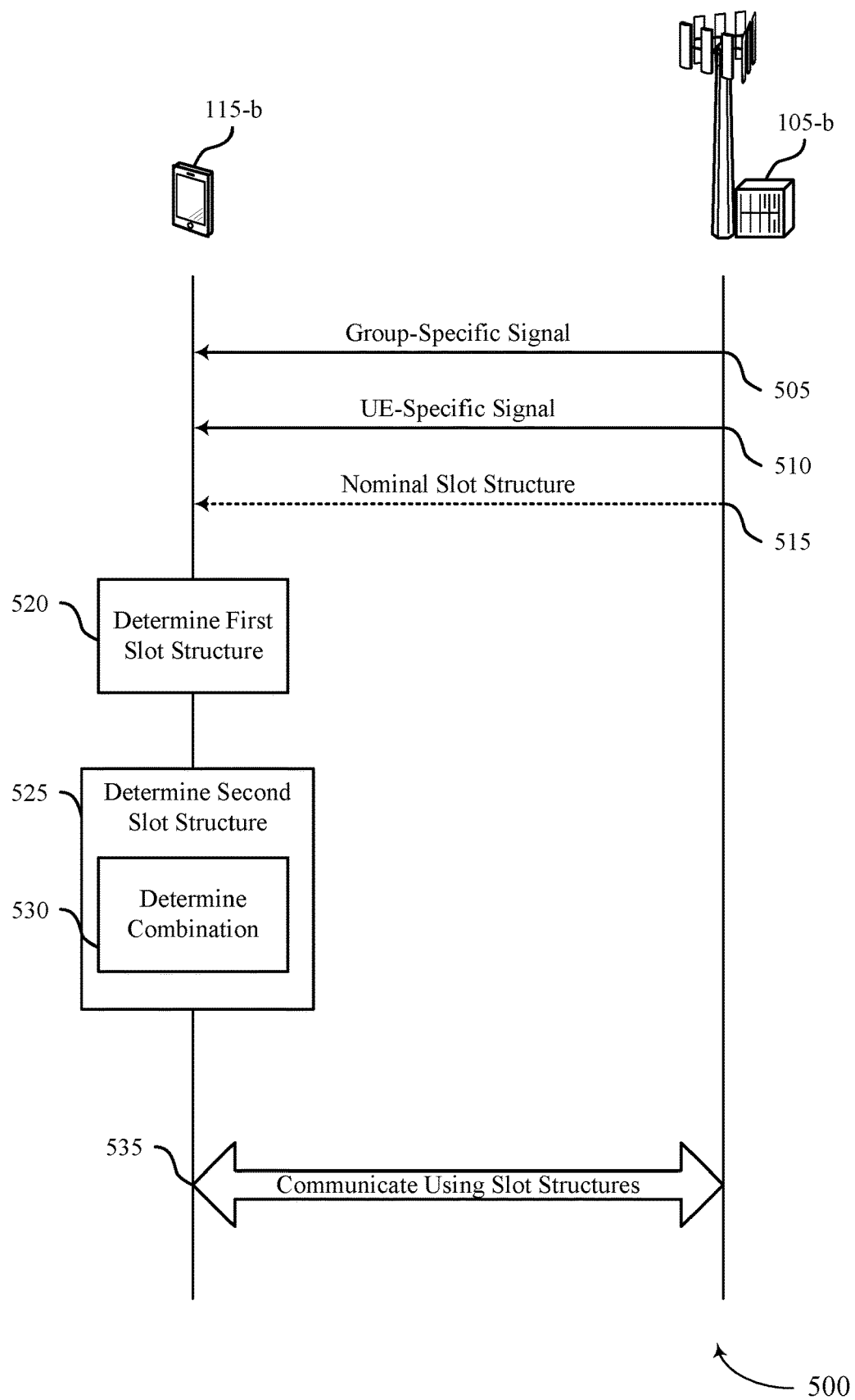
FIGS. 5 and 6 illustrates examples of a process flows that supports slot structure linkage in wireless systems in accordance with aspects of the present disclosure.

FIG. 5 illustrates an example of a process flow 500 that supports slot structure linkage in wireless systems in accordance with various aspects of the present disclosure. In some examples, process flow 500 may implement aspects of wireless communication systems 100 and 200. Process flow 500 illustrates aspects of techniques performed by a base station 105-b and a UE 115-b, which may be examples of a base station 105 and a UE 115 as described with reference to FIGS. 1 through 4.

In the following description of the process flow 500, the operations between the UE 115-b and base station 105-b may be performed in different orders or at different times. Certain operations may also be left out of the process flow 500, or other operations may be added to the process flow 500.

At operation 505, base station 105-b may transmit a group-specific signal including slot structure information (e.g., information related to a first slot structure) to be used in communications with UE 115-b. Base station 105-b may determine a default slot structure for the first slot, where the group-specific signal indicates the default slot structure. The group-specific signal may indicate the first slot structure for a set of UEs 115 including UE 115-b. The group-specific signal may be a group-specific PDCCH.

At operation 510, base station 105-b may transmit a UE-specific signal including additional slot structure information (e.g., additional information related to the first slot structure and/or a second slot structure). In some cases, the UE-specific signal may be based at least in part on the slot structure information of the group-specific signal. The UE-specific signal may indicate a set of slot structure combinations available for use by UE 115-*b*, where a second slot structure is based on the set of slot structure combinations. The UE-specific signal may be a UE-specific PDCCH. Additionally, the UE-specific signal may be dynamically or semi-statically transmitted.

At operation 515, base station 105-*b* may optionally identify and transmit an indication of a nominal slot structure for a sequence of slots, where each of the first slot structure for the first slot and a second slot structure for a subsequent second slot is compatible with the nominal slot structure.

At operation 520, UE 115-*b* may determine the first slot structure based at least in part the group-specific signal and the UE-specific signal received at 505 and 510. In some cases, the first slot structure may be determined based at least in part the group-specific signal irrespective of the UE-specific signal. Determining the first slot structure may include determining a default slot structure for the first slot.

At operation 525, UE 115-*b* may determine a second slot structure based at least in part on the group-specific signal, the UE-specific signal, or combinations thereof. The second slot structure may be based at least in part on a capability of UE 115-*b*, an operation to be performed by UE 115-*b*, an operational condition associated with UE 115-*b*, or a combination thereof.

At operation 530, UE 115-*b* may identify a set of slot structure combinations available for use by UE 115-*b* for the first slot and for the second slot, each combination having a downlink slot structure and an uplink slot structure. UE 115-*b* may select, for the first slot and the second slot, one combination of the set of slot structure combinations. The one combination of the set of slot structure combinations may be selected based at least in part on a capability of UE 115-*b*, an operation to be performed by UE 115-*b*, an operational condition associated with UE 115-*b*, or a combination thereof. Each of the first and second slot structures may include an uplink portion, a downlink portion, and a guard period portion.

At operation 535, UE 115-*b* and base station 105-*b* may communicate using the first slot structure for a first slot. In some cases, UE 115-*b* and base station 105-*b* may also communicate using the second slot structure for a second slot subsequent to the first slot. In some examples, the first slot and the second slot are consecutive slots in time (e.g., two slots in a subframe).

Figure 6:
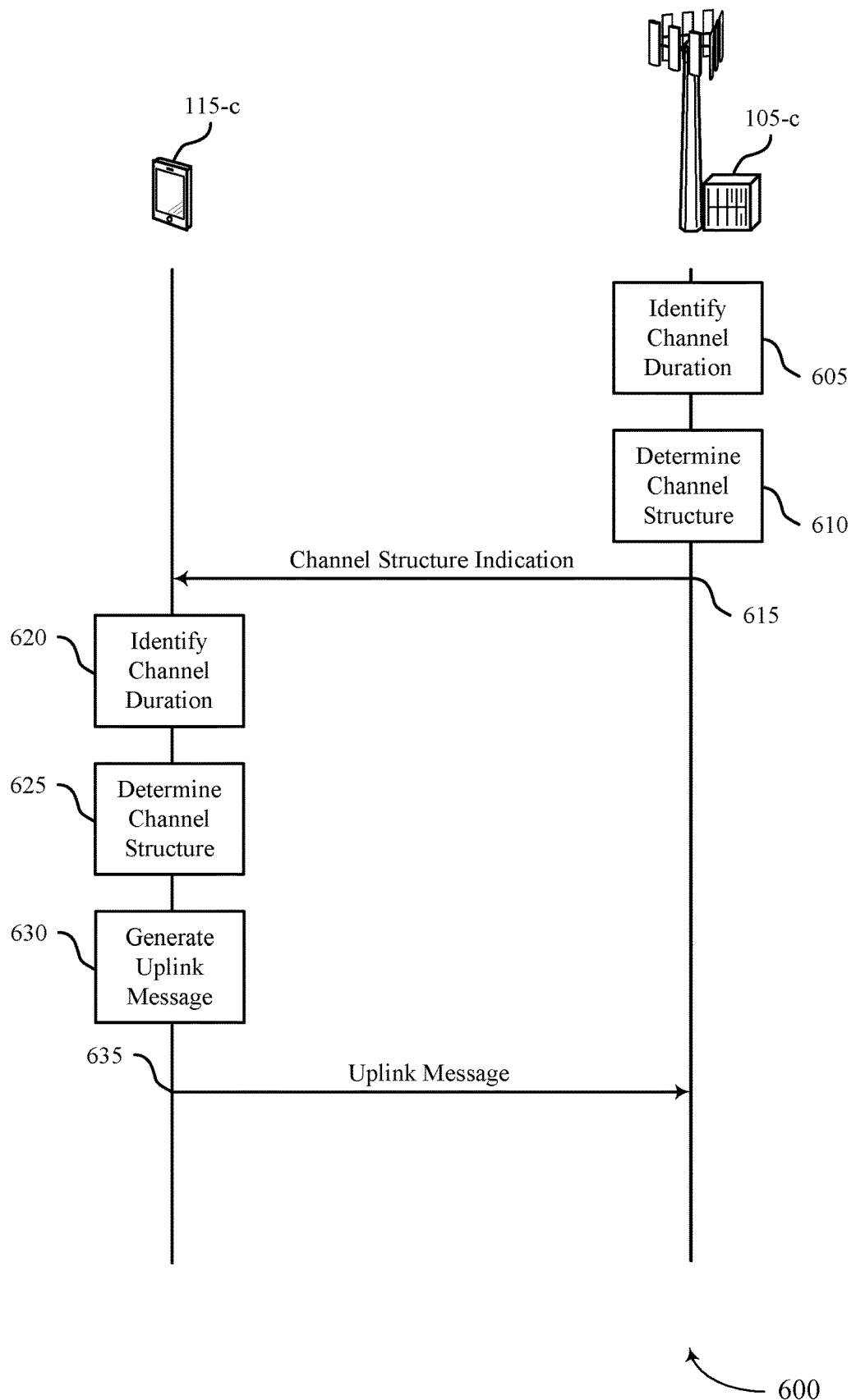

FIG. 6 illustrates an example of a process flow 600 that supports slot structure linkage in wireless systems in accordance with various aspects of the present disclosure. In some examples, process flow 600 may implement aspects of wireless communication systems 100 and 200. Process flow 600 illustrates aspects of techniques performed by a base station 105-*c* and a UE 115-*c*, which may be examples of a base station 105 and a UE 115 as described with reference to FIGS. 1 through 4.

In the following description of the process flow 600, the operations between the UE 115-*c* and base station 105-*c* may be performed in different orders or at different times. Certain operations may also be left out of the process flow 600, or other operations may be added to the process flow 600.

At operation 605, base station 105-*c* may identify a channel duration for a modular channel. At operation 610, base station 105-*c* may determine, for at least one UE (e.g., UE 115-*c*), a channel structure for the modular channel based at least in part on the channel duration. At operation 615, base station 105-*c* may transmit, to the at least one UE (e.g., UE 115-*c*), an indication of the channel structure. The indication may include a resource allocation that indicates time-frequency resources for the at least one UE (e.g., UE 115-*c*).

At operation 620, UE 115-*c* may identify a channel duration for a modular channel. At operation 625, UE 115-*c* may determine a channel structure for the modular channel based at least in part on the channel duration.

At operation 630, UE 115-*c* may generate an uplink message based at least in part on the channel structure, the uplink message having a duration that is an integer multiple of the channel duration.

At operation 635, UE 115-*c* may transmit, to base station 105-*c*, an uplink message using the modular channel according to the channel structure. Base station 105-*c* may receive, from the at least one UE (e.g., UE 115-*c*), a channel message in accordance with the channel structure. In some cases, the modular channel may be a modular PUCCH, the channel duration may be a PUCCH duration, and the uplink message may be a PUCCH message. Alternatively, the modular channel may be a modular PUSCH for modular-based MU-MIMO operation, the channel duration may be a PUSCH duration, and the uplink message may be a PUSCH message.

Figure 7:
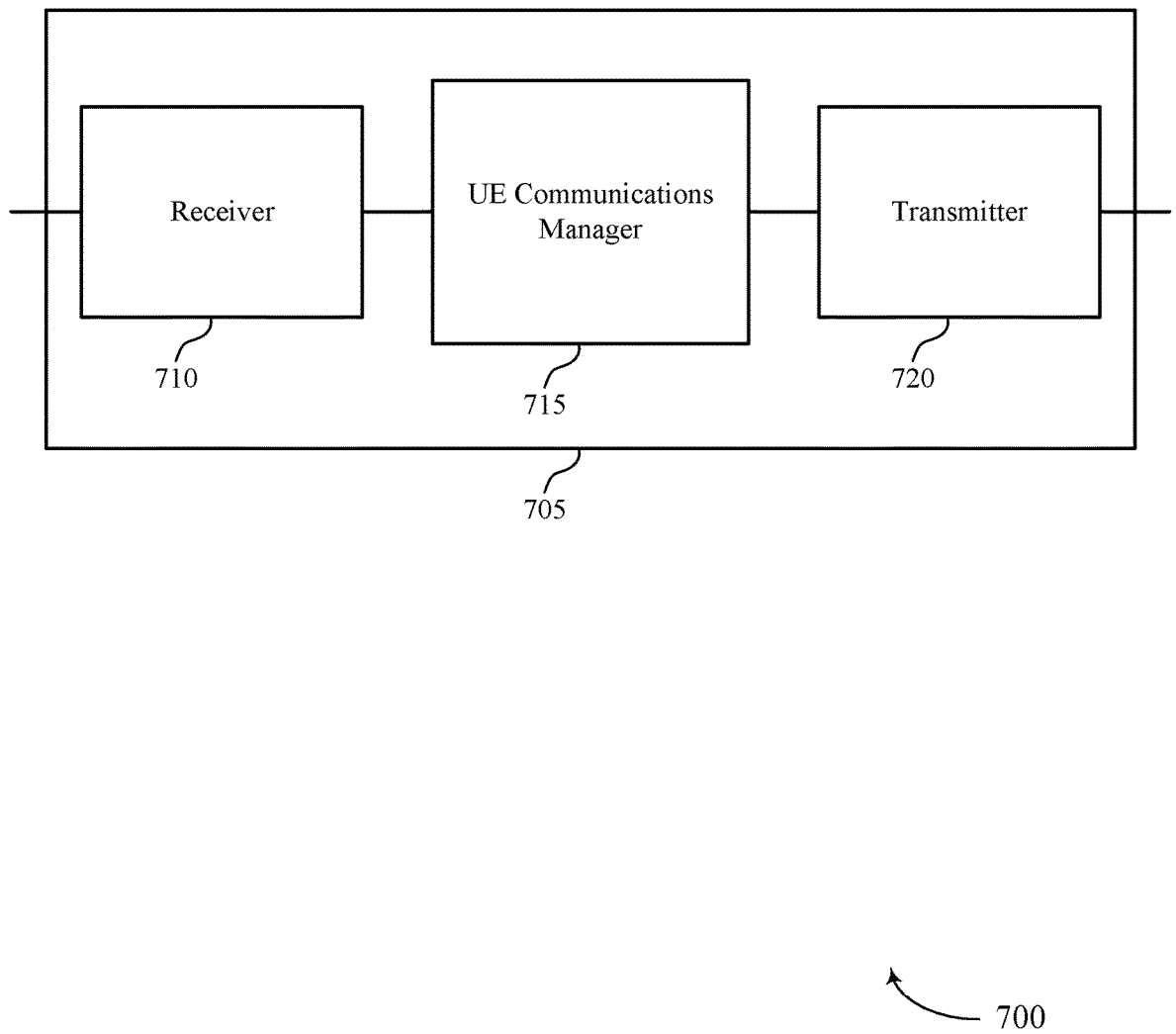
FIGS. 7 through 9 show block diagrams of a device that supports slot structure linkage in wireless systems in accordance with aspects of the present disclosure.

FIG. 7 shows a block diagram 700 of a wireless device 705 that supports slot structure linkage in wireless systems in accordance with aspects of the present disclosure. Wireless device 705 may be an example of aspects of a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to slot structure linkage in wireless systems, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10. UE communications manager 715 or at least some of its various sub-components may be implemented in hardware, software executed by a processor, firmware, or any combination thereof. If implemented in software executed by a processor, the functions of the UE communications manager 715 or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 715 or at least some of its various sub-components may be physically located at various positions, including being distributed such that portions of functions are implemented at different physical locations by one or more physical devices. In some examples, UE communications manager 715 or at least some of its various sub-components may be a separate and distinct component in accordance with various aspects of the present disclosure. In other examples, UE communications manager 715 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may receive a group-specific signal including slot structure information (e.g., information related to a first slot structure) to be used in communications with a base station and receive a UE-specific signal including additional slot structure information (e.g., additional information related to the first slot structure and/or a second slot structure). In some cases, the UE-specific signal may be based at least in part on the slot structure information of the group-specific signal. UE communications manager 715 may determine the first slot structure based at least in part the group-specific signal and the UE-specific signal and communicate with the base station using the first slot structure for a first slot. The UE communications manager 715 may also identify a channel duration for a modular channel and determine a channel structure for the modular channel based on the channel duration. UE communications manager 715 may transmit, to a base station, an uplink message using the modular channel according to the channel structure.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
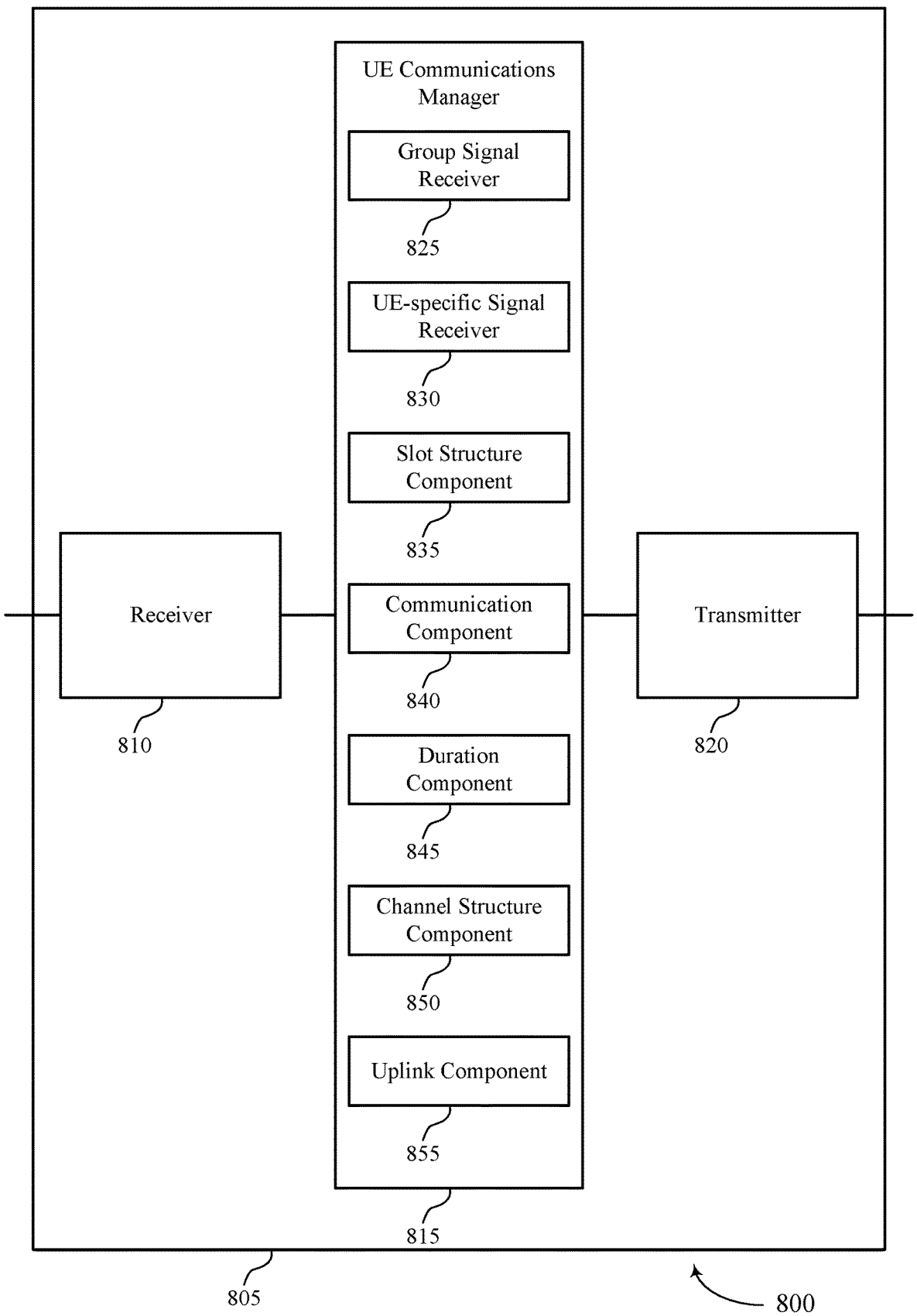

FIG. 8 shows a block diagram 800 of a wireless device 805 that supports slot structure linkage in wireless systems in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to slot structure linkage in wireless systems, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may also include group signal receiver 825, UE-specific signal receiver 830, slot structure component 835, communication component 840, duration component 845, channel structure component 850, and uplink component 855.

Group signal receiver 825 may receive a group-specific signal including slot structure information (e.g., information related to a first slot structure) to be used in communications with a base station. In some cases, the group-specific signal is a group-specific PDCCH.

UE-specific signal receiver 830 may receive a UE-specific signal including additional slot structure information (e.g., additional information related to the first slot structure and/or a second slot structure). In some cases, the UE-specific signal may be based at least in part on the slot structure information of the group-specific signal. In some cases, the UE-specific signal is a UE-specific PDCCH. In some cases, the UE-specific signal is dynamically or semi-statically received.

Slot structure component 835 may determine the first slot structure based at least in part the group-specific signal and the UE-specific signal and determine a second slot structure based on the group-specific signal, the UE-specific signal, or combinations thereof. Slot structure component 835 may identify a set of slot structure combinations available for use by a UE for the first slot and for a second slot, each combination having a downlink slot structure and an uplink slot structure and identify a nominal slot structure for a sequence of slots, where each of the first slot structure for the first slot and a second slot structure for a subsequent second slot is compatible with the nominal slot structure. In some cases, the second slot structure indicates multiple slot structures for respective slots subsequent to the first slot. In some examples, determining the first slot structure includes determining a default slot structure for the first slot. In some aspects, each of the first and second slot structures include an uplink portion, a downlink portion, and a guard period portion.

Communication component 840 may communicate with the base station using the first slot structure for a first slot and communicate with the base station using the second slot structure for a second slot subsequent to the first slot. In some examples, the first slot and the second slot are consecutive slots in time (e.g., two slots in a subframe).

Duration component 845 may identify a channel duration for a modular channel.

Channel structure component 850 may determine, by a UE, a channel structure for the modular channel based on the channel duration.

Uplink component 855 may transmit, to a base station, an uplink message using the modular channel according to the channel structure. In some cases, the modular channel is a modular PUCCH, the channel duration is a PUCCH duration, and the uplink message is a PUCCH message. In some examples, the modular channel is a modular PUSCH for modular-based MU-MIMO operation, the channel duration is a PUSCH duration, and the uplink message is a PUSCH message.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
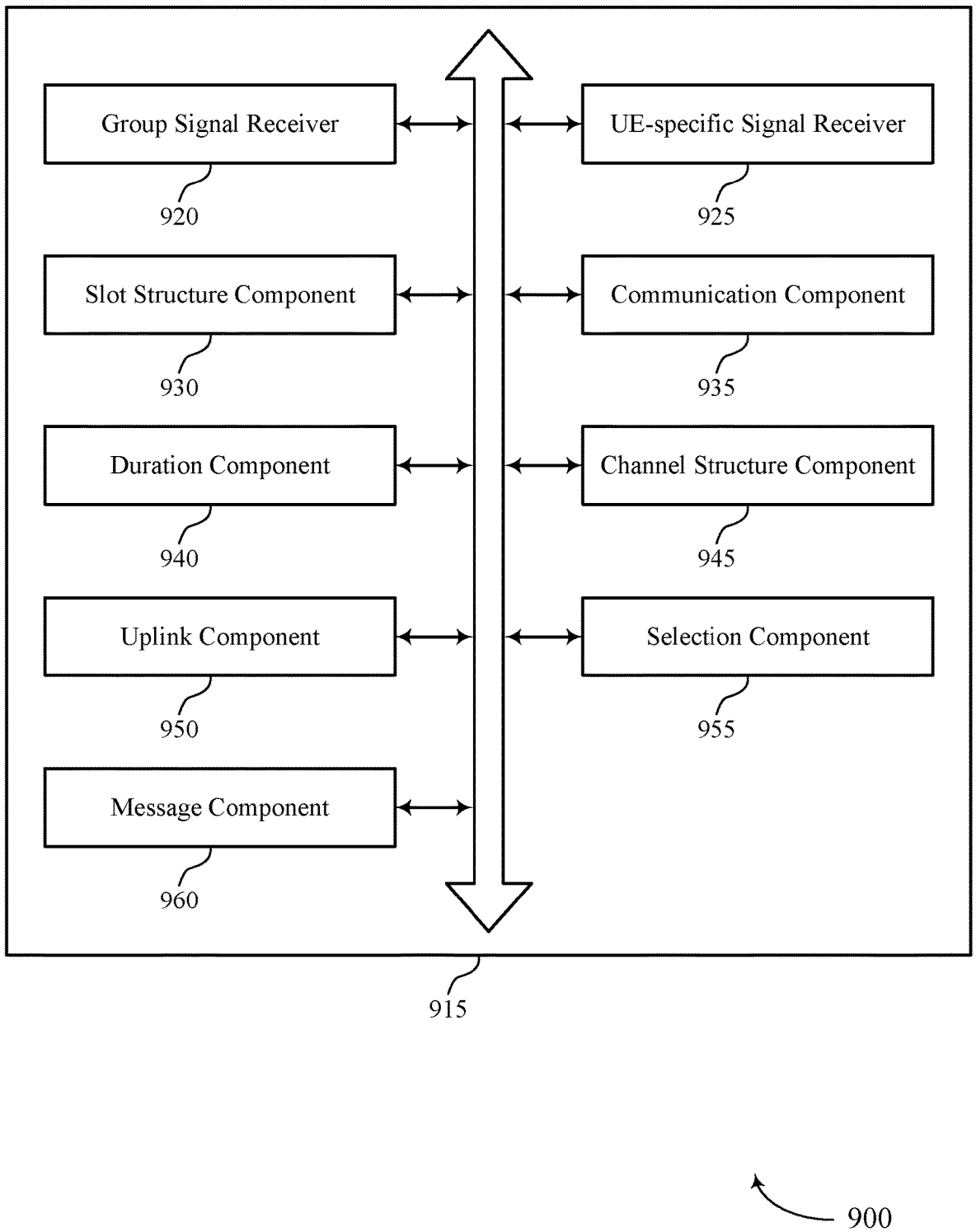

FIG. 9 shows a block diagram 900 of a UE communications manager 915 that supports slot structure linkage in wireless systems in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include group signal receiver 920, UE-specific signal receiver 925, slot structure component 930, communication component 935, duration component 940, channel structure component 945, uplink component 950, selection component 955, and message component 960. Each of these modules may communicate, directly or indirectly, with one another (e.g., via one or more buses).

Group signal receiver 920 may receive a group-specific signal including slot structure information (e.g., information related to a first slot structure) to be used in communications with a base station. In some cases, the group-specific signal is a group-specific PDCCH.

UE-specific signal receiver 925 may receive a UE-specific signal including additional slot structure information (e.g., additional information related to the first slot structure and/or a second slot structure). In some cases, the UE-specific signal may be based at least in part on the slot structure information of the group-specific signal. In some cases, the UE-specific signal is a UE-specific PDCCH. In some cases, the UE-specific signal is dynamically or semi-statically received.

Slot structure component 930 may determine the first slot structure based at least in part the group-specific signal and the UE-specific signal and determine a second slot structure based on the group-specific signal, the UE-specific signal, or combinations thereof. Slot structure component 930 may identify a set of slot structure combinations available for use by a UE for the first slot and for a second slot, each combination having a downlink slot structure and an uplink slot structure and identify a nominal slot structure for a sequence of slots, where each of the first slot structure for the first slot and a second slot structure for a subsequent second slot is compatible with the nominal slot structure. In some cases, the second slot structure indicates multiple slot structures for respective slots subsequent to the first slot. In some examples, determining the first slot structure includes determining a default slot structure for the first slot. In some aspects, each of the first and second slot structures include an uplink portion, a downlink portion, and a guard period portion.

Communication component 935 may communicate with the base station using the first slot structure for a first slot and communicate with the base station using the second slot structure for a second slot subsequent to the first slot. In some examples, the first slot and the second slot are consecutive slots in time (e.g., two slots in a subframe).

Duration component 940 may identify a channel duration for a modular channel. In some cases, the channel duration may be identified based at least in part on the slot structure. In some examples, the modular channel may comprise time-frequency resources for a set of symbols within a slot.

Channel structure component 945 may determine a channel structure for the modular channel based on the channel duration.

Uplink component 950 may transmit, to a base station, an uplink message using the modular channel according to the channel structure. In some cases, the modular channel is a modular PUCCH, the channel duration is a PUCCH duration, and the uplink message is a PUCCH message. In some examples, the modular channel is a modular PUSCH for modular-based MU-MIMO operation, the channel duration is a PUSCH duration, and the uplink message is a PUSCH message.

Selection component 955 may select, for the first slot and the second slot, one combination of the set of slot structure combinations. In some cases, the one combination of the set of slot structure combinations is selected based on a capability of the UE, an operation to be performed by the UE, an operational condition associated with the UE, or a combination thereof.

Message component 960 may generate the uplink message based on the channel structure, the uplink message having a duration that is an integer multiple of the channel duration.

Figure 10:
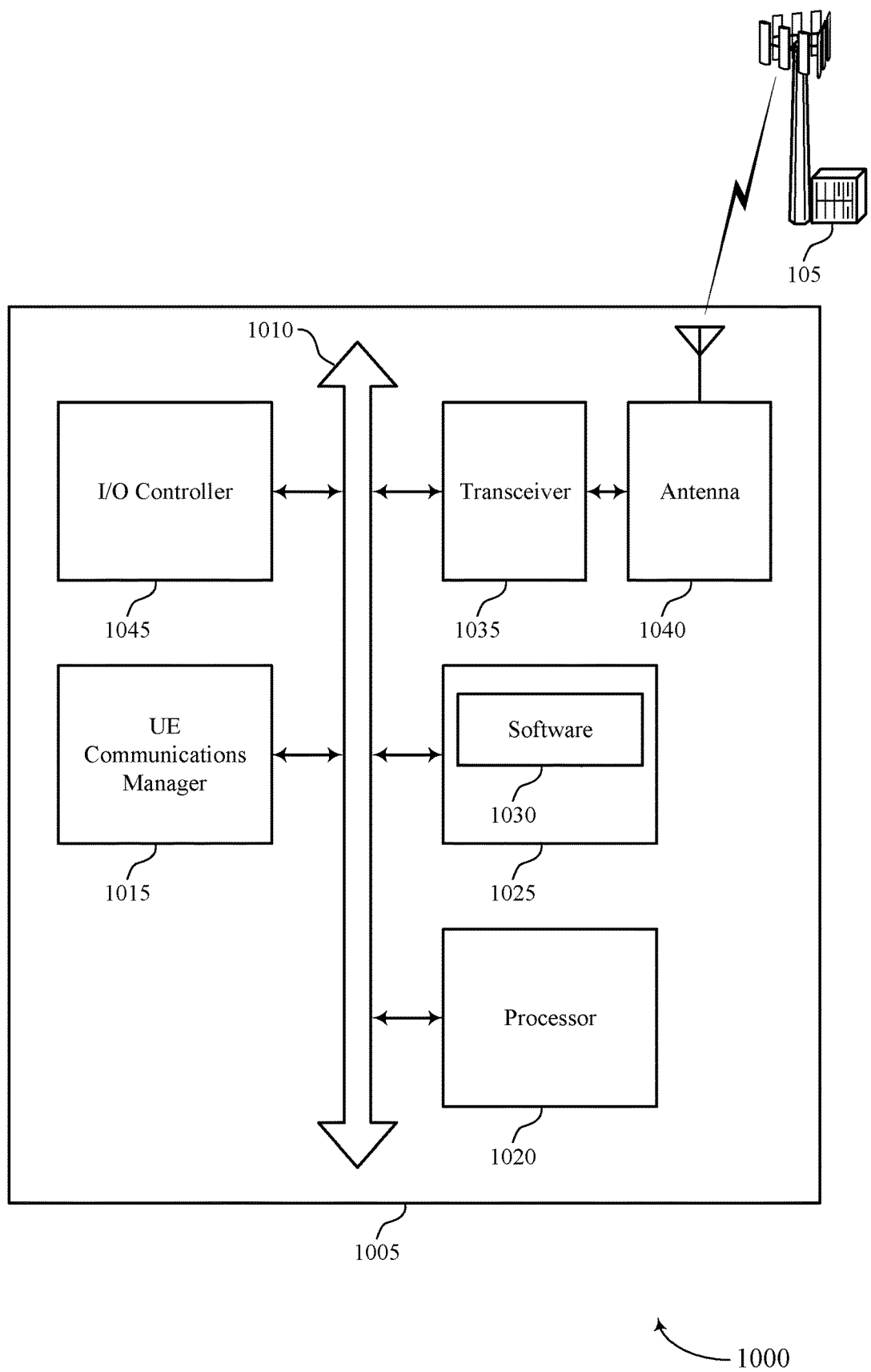
FIG. 10 illustrates a block diagram of a system including a user equipment (UE) that supports slot structure linkage in wireless systems in accordance with aspects of the present disclosure.

FIG. 10 shows a diagram of a system 1000 including a device 1005 that supports slot structure linkage in wireless systems in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting slot structure linkage in wireless systems).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support slot structure linkage in wireless systems. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
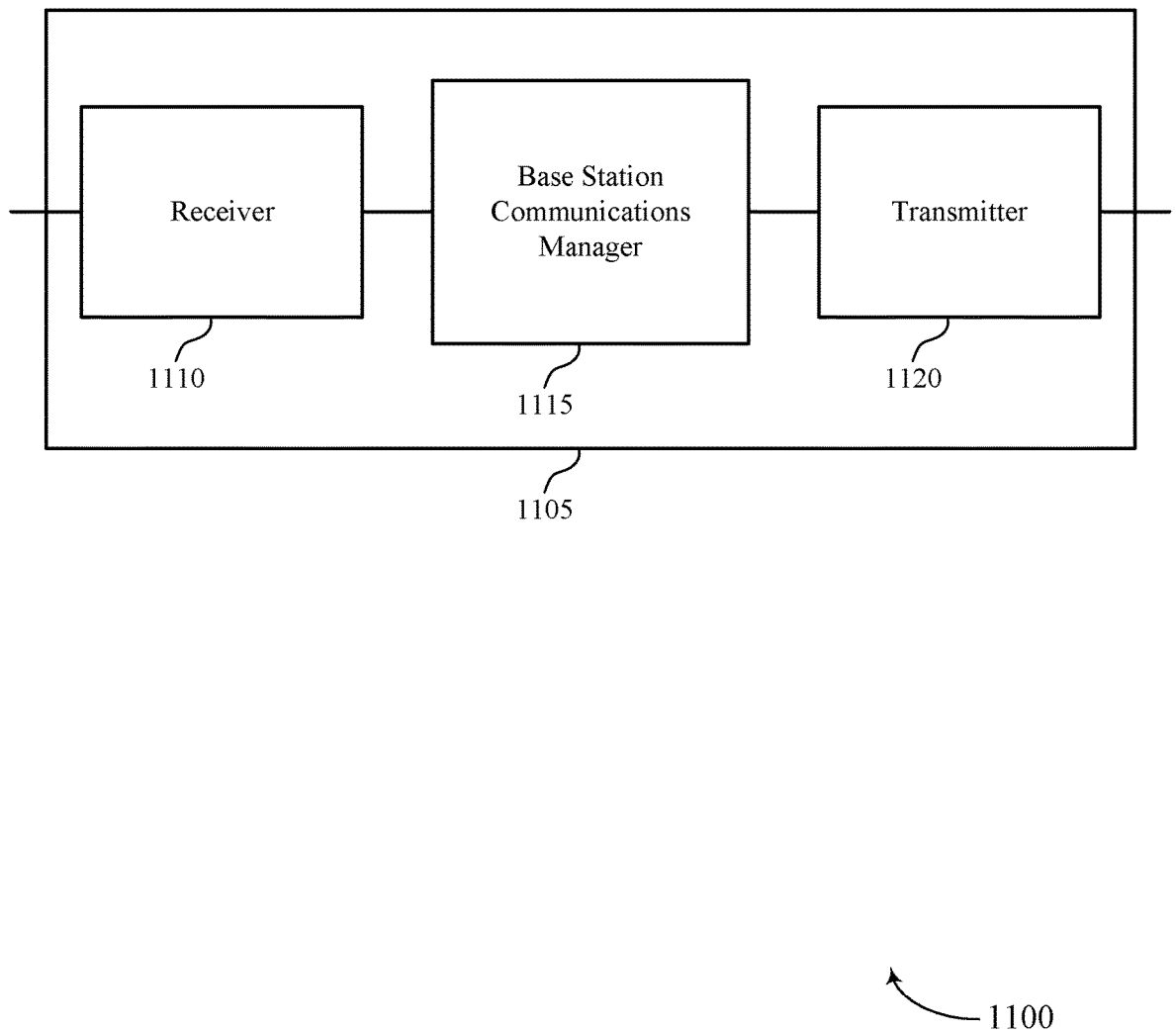
FIGS. 11 through 13 show block diagrams of a device that supports slot structure linkage in wireless systems in accordance with aspects of the present disclosure.

FIG. 11 shows a block diagram 1100 of a wireless device 1105 that supports slot structure linkage in wireless systems in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to slot structure linkage in wireless systems, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14. Base station communications manager 1115 or at least some of its various sub-components may be implemented in hardware, software executed by a processor, firmware, or any combination thereof. If implemented in software executed by a processor, the functions of the base station communications manager 1115 or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1115 or at least some of its various sub-components may be physically located at various positions, including being distributed such that portions of functions are implemented at different physical locations by one or more physical devices. In some examples, base station communications manager 1115 or at least some of its various sub-components may be a separate and distinct component in accordance with various aspects of the present disclosure. In other examples, base station communications manager 1115 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may transmit a group-specific signal including slot structure information (e.g., information related to a first slot structure) to be used in communications with a UE and transmit a UE-specific signal including additional slot structure information (e.g., additional information related to the first slot structure and/or a second slot structure). In some cases, the UE-specific signal may be based at least in part on the slot structure information of the group-specific signal. Base station communications manager 1115 may communicate with the UE using a first slot structure over a first slot. The first slot structure may be based at least in part the group-specific signal and the UE-specific signal. In some cases, the first slot structure may be based at least in part the group-specific signal irrespective of the UE-specific signal. The base station communications manager 1115 also may identify a channel duration for a modular channel and determine, for at least one UE, a channel structure for the modular channel based on the channel duration. The base station communications manager 1115 also may transmit, to the at least one UE, an indication of the channel structure.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
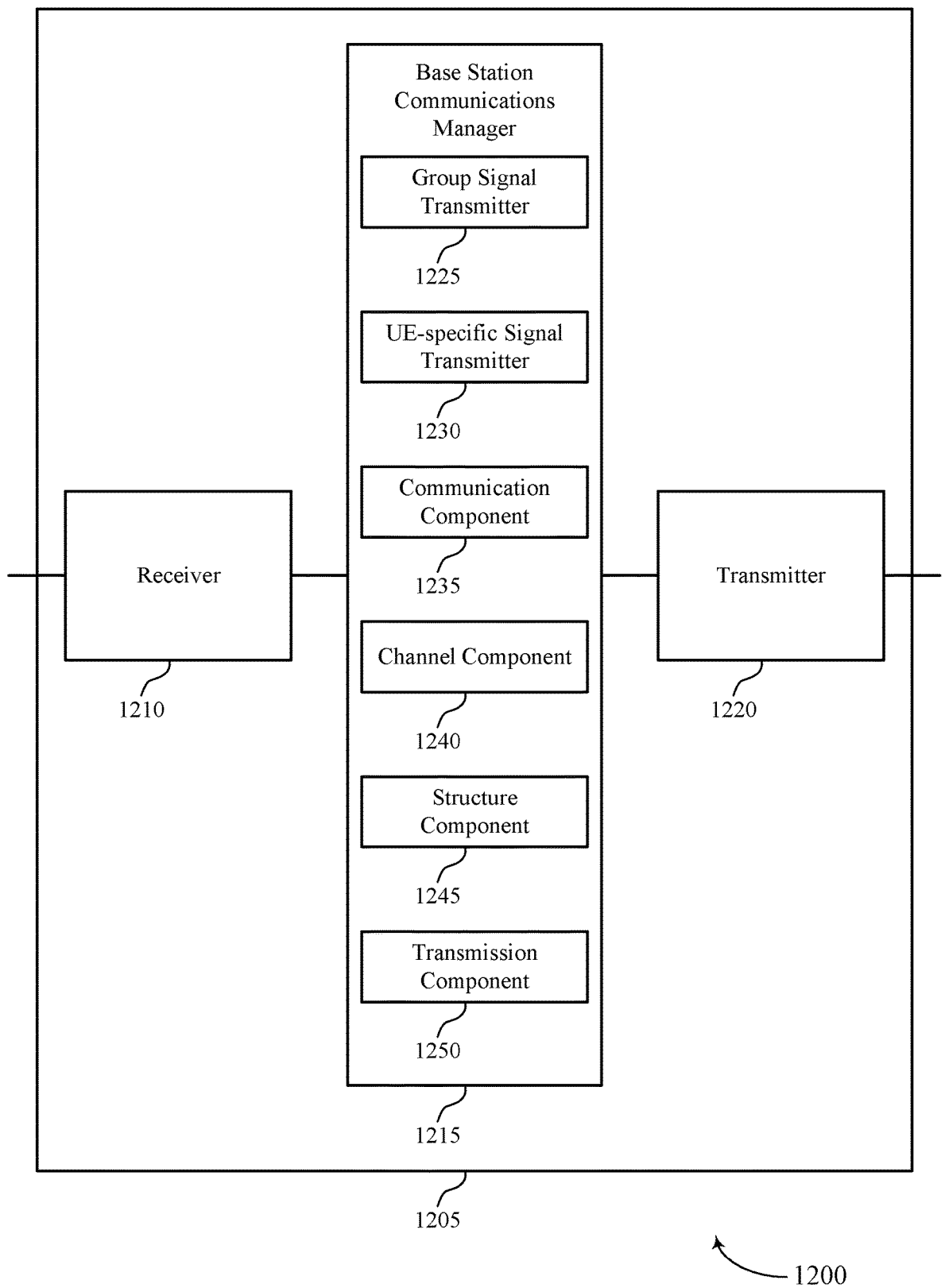

FIG. 12 shows a block diagram 1200 of a wireless device 1205 that supports slot structure linkage in wireless systems in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to slot structure linkage in wireless systems, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14. Base station communications manager 1215 may also include group signal transmitter 1225, UE-specific signal transmitter 1230, communication component 1235, channel component 1240, structure component 1245, and transmission component 1250.

Group signal transmitter 1225 may transmit a group-specific signal including slot structure information (e.g., information related to a first slot structure) to be used in communications with a UE. In some cases, the group-specific signal indicates the first slot structure for a set of UEs including the UE. In some examples, the group-specific signal is a group-specific PDCCH.

UE-specific signal transmitter 1230 may transmit a UE-specific signal including additional slot structure information (e.g., additional information related to the first slot structure and/or a second slot structure). In some cases, the UE-specific signal may be based at least in part on the slot structure information of the group-specific signal. In some cases, the UE-specific signal indicates a set of slot structure combinations available for use by the UE, where the second slot structure is based on the set of slot structure combinations. In some examples, the UE-specific signal is a UE-specific PDCCH. In some aspects, the UE-specific signal is dynamically or semi-statically transmitted.

Communication component 1235 may communicate with the UE using a first slot structure over a first slot and communicate with the UE using a second slot structure for a second slot subsequent to the first slot, the second slot structure based on the group-specific signal and the UE-specific signal. In some cases, the second slot structure is based on a capability of the UE, an operation to be performed by the UE, an operational condition associated with the UE, or a combination thereof. In some examples, the second slot structure indicates multiple slot structures for respective slots subsequent to the first slot.

Channel component 1240 may identify a channel duration for a modular channel. In some cases, the channel duration may be identified based at least in part on the slot structure. In some examples, the modular channel may comprise time-frequency resources for a set of symbols within a slot.

Structure component 1245 may determine, for at least one UE, a channel structure for the modular channel based on the channel duration.

Transmission component 1250 may transmit, to the at least one UE, an indication of the channel structure. In some cases, the indication includes a resource allocation that indicates time-frequency resources for the at least one UE.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
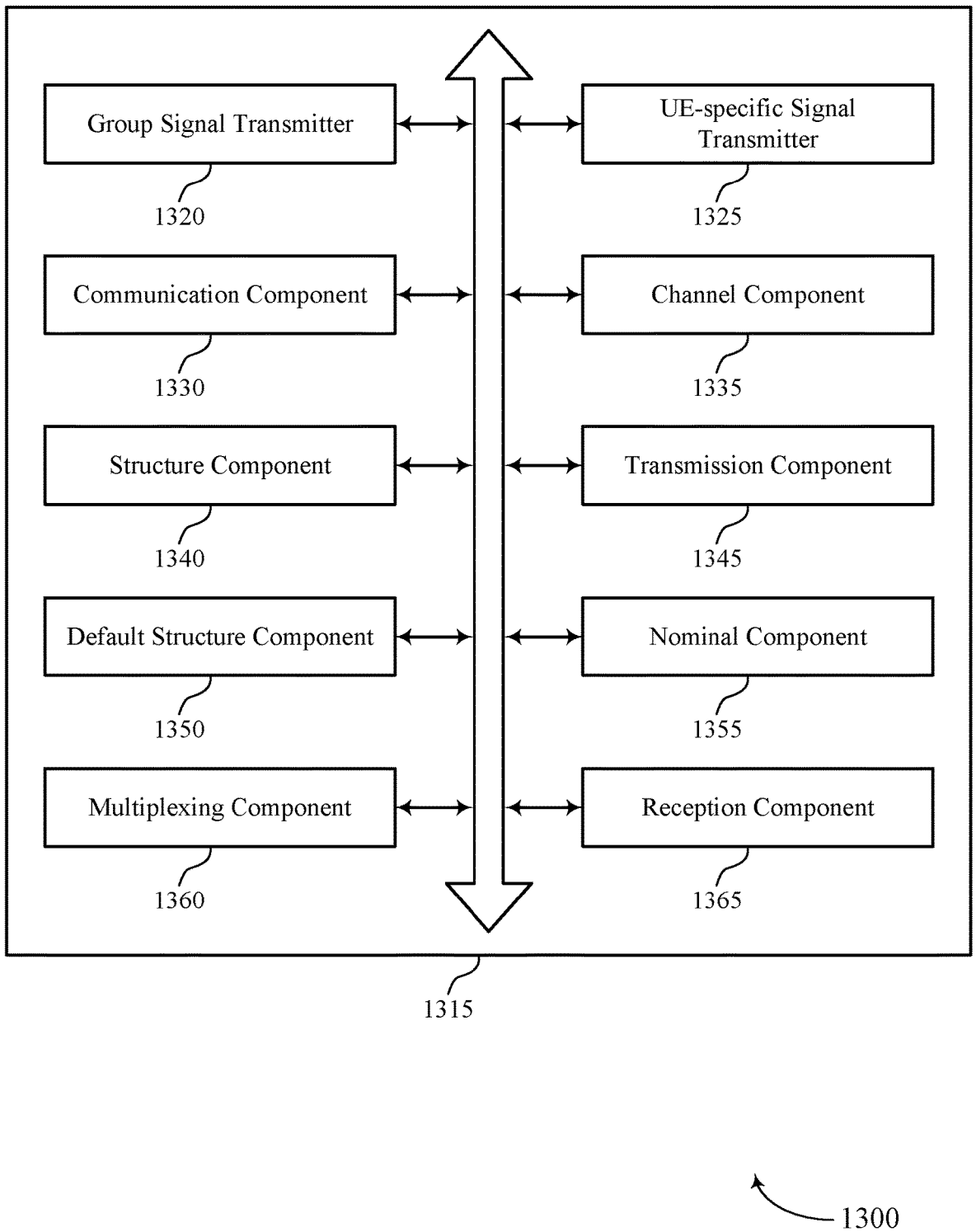

FIG. 13 shows a block diagram 1300 of a base station communications manager 1315 that supports slot structure linkage in wireless systems in accordance with aspects of the present disclosure. The base station communications manager 1315 may be an example of aspects of a base station communications manager 1415 described with reference to FIGS. 11, 12, and 14. The base station communications manager 1315 may include group signal transmitter 1320, UE-specific signal transmitter 1325, communication component 1330, channel component 1335, structure component 1340, transmission component 1345, default structure component 1350, nominal component 1355, multiplexing component 1360, and reception component 1365. Each of these modules may communicate, directly or indirectly, with one another (e.g., via one or more buses).

Group signal transmitter 1320 may transmit a group-specific signal including slot structure information (e.g., information related to a first slot structure) to be used in communications with a UE. In some cases, the group-specific signal indicates the first slot structure for a set of UEs including the UE. In some examples, the group-specific signal is a group-specific PDCCH.

UE-specific signal transmitter 1325 may transmit a UE-specific signal including additional slot structure information (e.g., additional information related to the first slot structure and/or a second slot structure). In some cases, the UE-specific signal may be based at least in part on the slot structure information of the group-specific signal. In some cases, the UE-specific signal indicates a set of slot structure combinations available for use by the UE, where the second slot structure is based on the set of slot structure combinations. In some examples, the UE-specific signal is a UE-specific PDCCH. In some aspects, the UE-specific signal is dynamically or semi-statically transmitted.

Communication component 1330 may communicate with the UE using a first slot structure over a first slot and communicate with the UE using a second slot structure for a second slot subsequent to the first slot, the second slot structure based on the group-specific signal and the UE-specific signal. In some cases, the second slot structure is based on a capability of the UE, an operation to be performed by the UE, an operational condition associated with the UE, or a combination thereof. In some examples, the second slot structure indicates multiple slot structures for respective slots subsequent to the first slot.

Channel component 1335 may identify a channel duration for a modular channel. In some cases, the channel duration may be identified based at least in part on the slot structure. In some examples, the modular channel may comprise time-frequency resources for a set of symbols within a slot.

Structure component 1340 may determine, for at least one UE, a channel structure for the modular channel based on the channel duration.

Transmission component 1345 may transmit, to the at least one UE, an indication of the channel structure. In some cases, the indication includes a resource allocation that indicates time-frequency resources for the at least one UE.

Default structure component 1350 may determine a default slot structure for the first slot, where the group-specific signal indicates the default slot structure.

Nominal component 1355 may identify a nominal slot structure for a sequence of slots, where each of the first slot structure for the first slot and a second slot structure for a subsequent second slot is compatible with the nominal slot structure. In some cases, each of the first and second slot structures include an uplink portion, a downlink portion, and a guard period portion.

Multiplexing component 1360 may multiplex a set of channels in a slot based on the channel duration, where each of the set of channels corresponds to a respective UE. In some cases, at least two of the set of channels are multiplexed across different physical resource blocks. In some cases, at least two of the set of channels have different channel durations. For example, a first channel of the set of channels may have an interval duration different from an interval duration of a second channel of the set of channels. In some cases, the interval duration of the second channel may be an integer multiple of the interval duration of the first channel.

Reception component 1365 may receive, from the at least one UE, a channel message in accordance with the channel structure. In some cases, the modular channel is a modular PUCCH, the channel duration is a PUCCH duration, and the channel message is a PUCCH message. In some examples, the modular channel is a modular PUSCH for modular-based MU-MIMO operation, the channel duration is a PUSCH duration, and the channel message is a PUSCH message.

Figure 14:
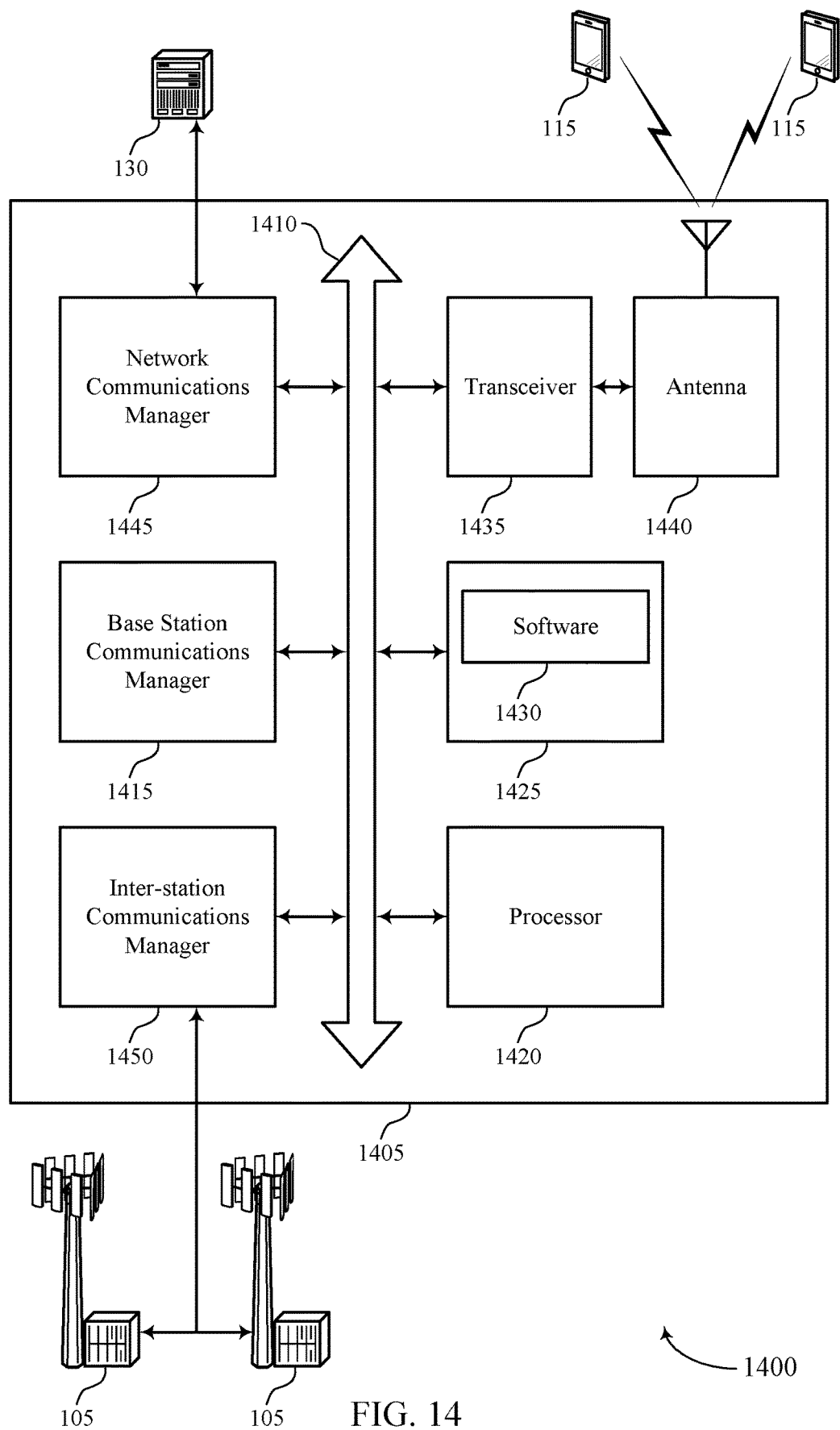
FIG. 14 illustrates a block diagram of a system including a base station that supports slot structure linkage in wireless systems in accordance with aspects of the present disclosure.

FIG. 14 shows a diagram of a system 1400 including a device 1405 that supports slot structure linkage in wireless systems in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting slot structure linkage in wireless systems).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support slot structure linkage in wireless systems. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an LTE/LTE-A wireless communication network technology to provide communication between base stations 105.

Figure 15:
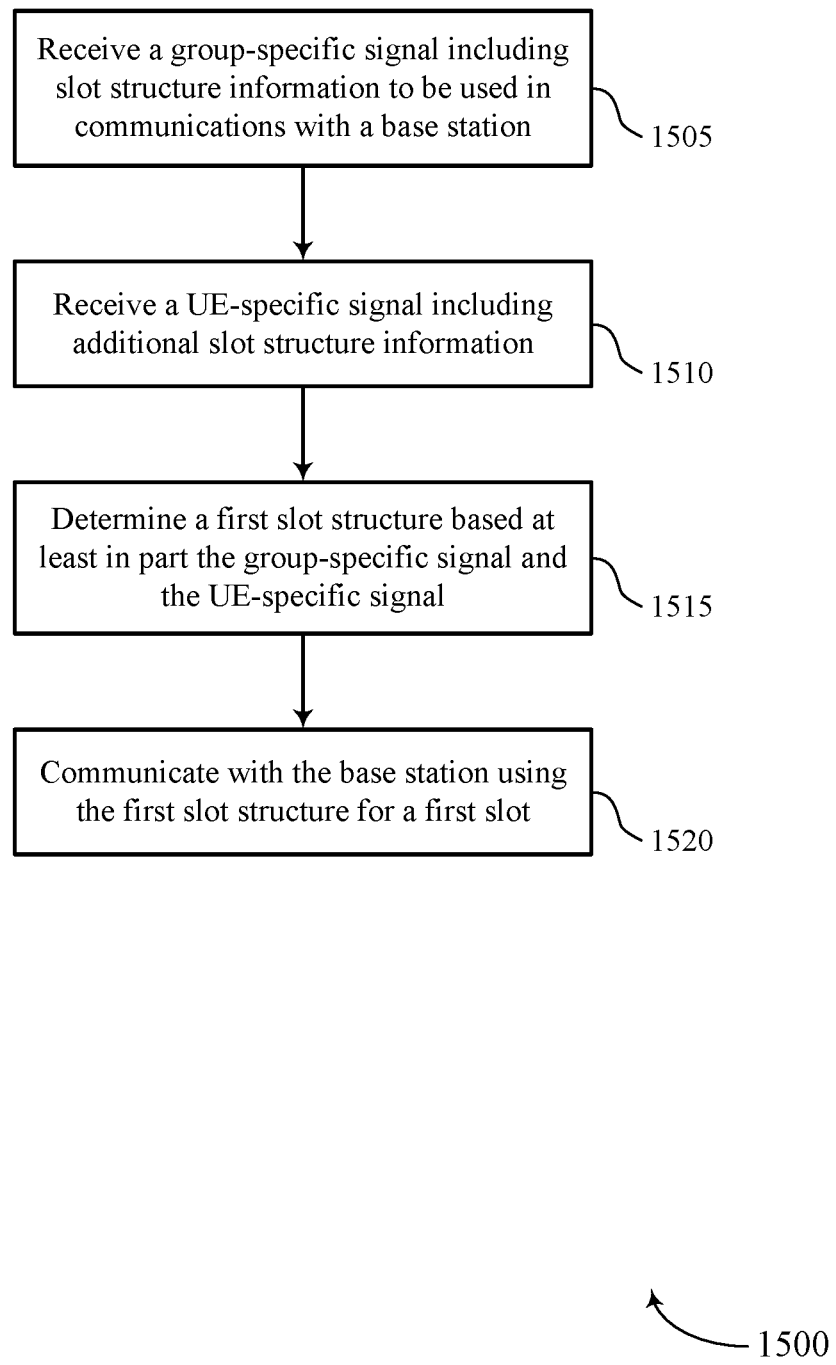
FIGS. 15 through 18 illustrate methods for slot structure linkage in wireless systems in accordance with aspects of the present disclosure.

FIG. 15 shows a flowchart illustrating a method 1500 for slot structure linkage in wireless systems in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive a group-specific signal including slot structure information (e.g., information related to a first slot structure) to be used in communications with a base station 105. The operations of block 1505 may be performed according to the methods described herein. In certain examples, aspects of the operations of block 1505 may be performed by a group signal receiver as described with reference to FIGS. 7 through 10.

At block 1510 the UE 115 may receive a UE-specific signal including additional slot structure information (e.g., additional information related to the first slot structure and/or a second slot structure). In some cases, the UE-specific signal may be based at least in part on the slot structure information of the group-specific signal. The operations of block 1510 may be performed according to the methods described herein. In certain examples, aspects of the operations of block 1510 may be performed by a UE-specific signal receiver as described with reference to FIGS. 7 through 10.

At block 1515 the UE 115 may determine the first slot structure based at least in part the group-specific signal and the UE-specific signal. The operations of block 1515 may be performed according to the methods described herein. In certain examples, aspects of the operations of block 1515 may be performed by a slot structure component as described with reference to FIGS. 7 through 10.

At block 1520 the UE 115 may communicate with the base station 105 using the first slot structure for a first slot. The operations of block 1520 may be performed according to the methods described herein. In certain examples, aspects of the operations of block 1520 may be performed by a communication component as described with reference to FIGS. 7 through 10.

Figure 16:
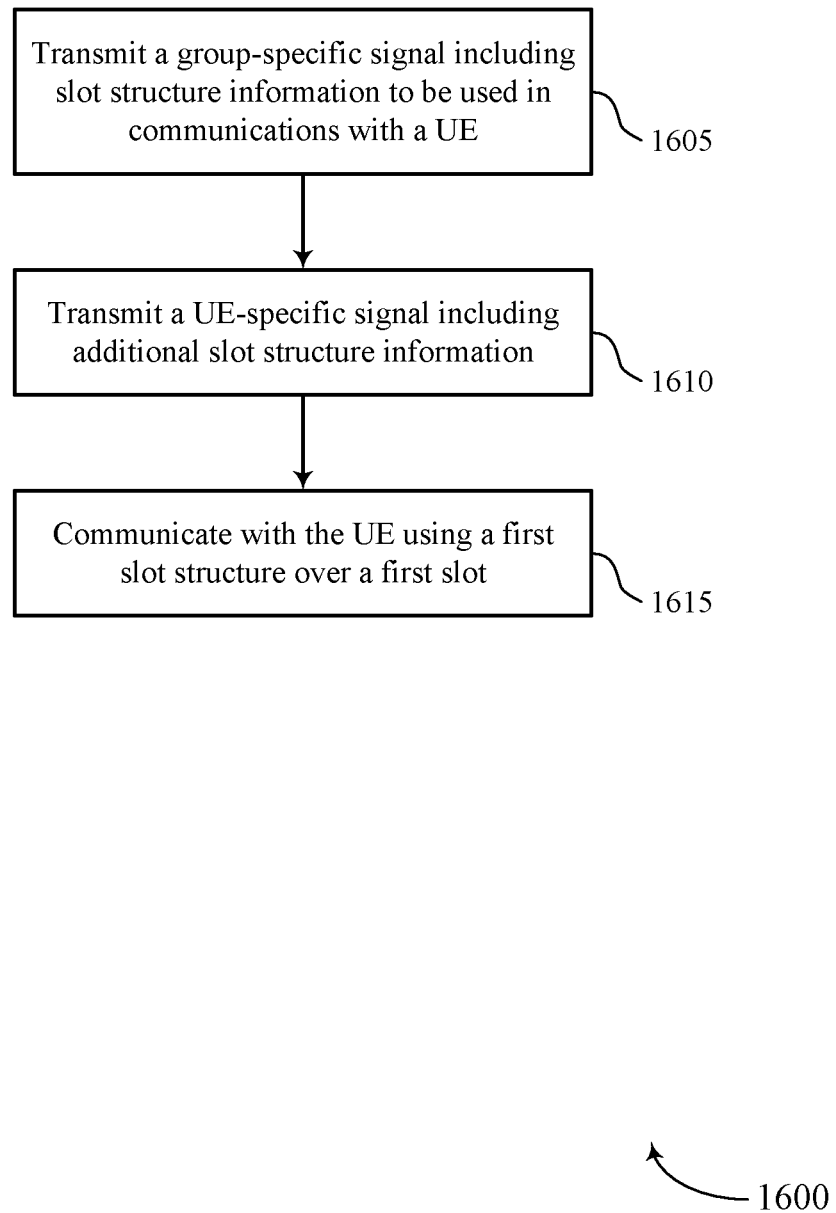

FIG. 16 shows a flowchart illustrating a method 1600 for slot structure linkage in wireless systems in accordance with aspects of the present disclosure. The operations of method 1600 may be implemented by a base station 105 or its components as described herein. For example, the operations of method 1600 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may transmit a group-specific signal including slot structure information (e.g., information related to a first slot structure) to be used in communications with a UE. The operations of block 1605 may be performed according to the methods described herein. In certain examples, aspects of the operations of block 1605 may be performed by a group signal transmitter as described with reference to FIGS. 11 through 14.

At block 1610 the base station 105 may transmit a UE-specific signal including additional slot structure information (e.g., additional information related to the first slot structure and/or a second slot structure). In some cases, the UE-specific signal may be based at least in part on the slot structure information of the group-specific signal. The operations of block 1610 may be performed according to the methods described herein. In certain examples, aspects of the operations of block 1610 may be performed by a UE-specific signal transmitter as described with reference to FIGS. 11 through 14.

At block 1615 the base station 105 may communicate with the UE using a first slot structure over a first slot. The first slot structure may be based at least in part the group-specific signal and the UE-specific signal. In some cases, the first slot structure may be based at least in part the group-specific signal irrespective of the UE-specific signal. The operations of block 1615 may be performed according to the methods described herein. In certain examples, aspects of the operations of block 1615 may be performed by a communication component as described with reference to FIGS. 11 through 14.

Figure 17:
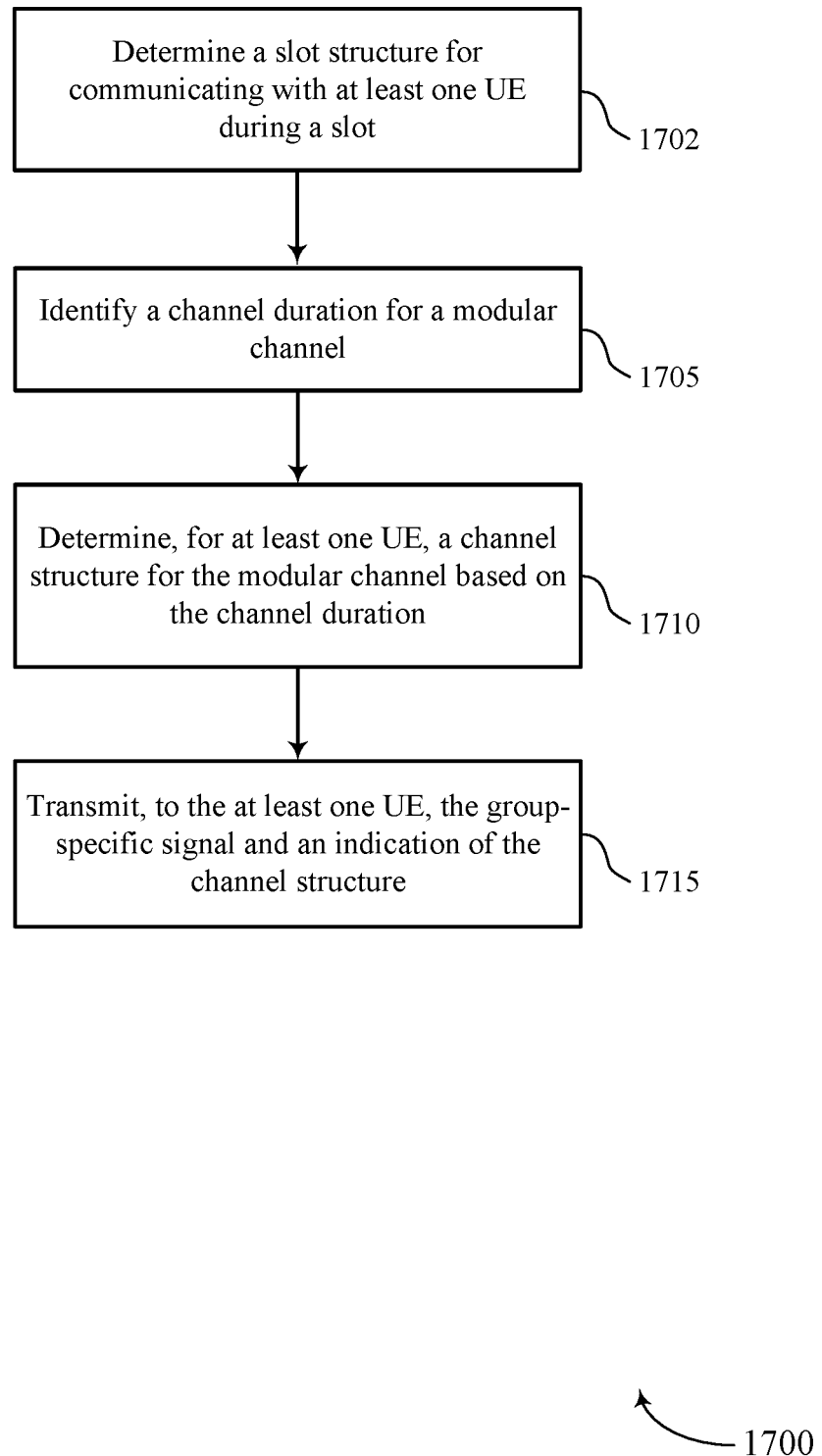

FIG. 17 shows a flowchart illustrating a method 1700 for slot structure linkage in wireless systems in accordance with aspects of the present disclosure. The operations of method 1700 may be implemented by a base station 105 or its components as described herein. For example, the operations of method 1700 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1702 the base station 105 may determine a slot structure for communicating with at least one UE during a slot. In some cases, the slot structure may be determined based at least on a group-specific signal. In some cases, the slot structure may be determined based at least on a UE-specific signal in addition to the group-specific signal. In some examples, the slot may be a first slot of a subframe. In other examples, the slot may be a second slot of a subframe. The operations of block 1702 may be performed according to the methods described herein. In certain examples, aspects of the operations of block 1702 may be performed by a channel component as described with reference to FIGS. 11 through 14.

At block 1705 the base station 105 may identify a channel duration for a modular channel. The channel duration may be identified based at least in part on the slot structure. In some cases, the modular channel may comprise time-frequency resources for a set of symbols within the slot. For example, depending on a number of uplink symbols designated for the slot structure of the slot, the channel duration may be longer (e.g., including 8 or 12 symbols) or shorter (e.g., including 2 or 4 symbols). The operations of block 1705 may be performed according to the methods described herein. In certain examples, aspects of the operations of block 1705 may be performed by a channel component as described with reference to FIGS. 11 through 14.

At block 1710 the base station 105 may determine, for at least one UE, a channel structure for the modular channel based at least in part on the channel duration. The operations of block 1710 may be performed according to the methods described herein. In certain examples, aspects of the operations of block 1710 may be performed by a structure component as described with reference to FIGS. 11 through 14.

At block 1715 the base station 105 may transmit, to the at least one UE, a group-specific signal and an indication of the channel structure. In some examples, the base station 105 may additionally transmit a UE-specific signal. The operations of block 1715 may be performed according to the methods described herein. In certain examples, aspects of the operations of block 1715 may be performed by a transmission component as described with reference to FIGS. 11 through 14.

Figure 18:
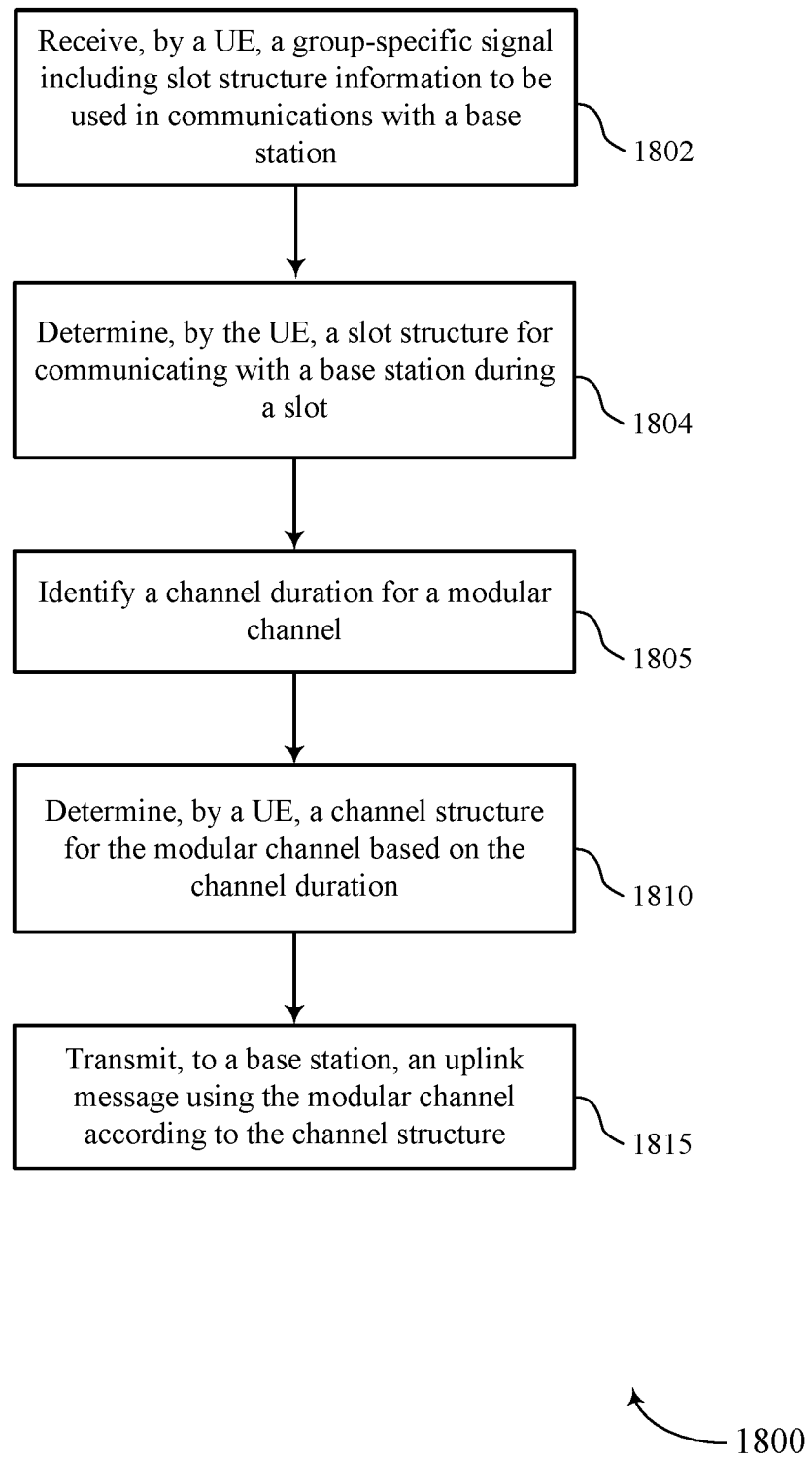

FIG. 18 shows a flowchart illustrating a method 1800 for slot structure linkage in wireless systems in accordance with aspects of the present disclosure. The operations of method 1800 may be implemented by a UE 115 or its components as described herein. For example, the operations of method 1800 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1802 the UE 115 may receive a group-specific signal including slot structure information to be used in communications with a base station 105. In some cases, the UE 115 may receive a UE-specific signal including additional slot structure information. The operations of block 1802 may be performed according to the methods described herein. In certain examples, aspects of the operations of block 1802 may be performed by a duration component as described with reference to FIGS. 7 through 10.

At block 1804 the UE 115 may determine a slot structure for communicating with a base station 105 during a slot. In some cases, the slot structure may be determined based at least on a group-specific signal. In some cases, the slot structure may be determined based at least on the UE-specific signal in addition to the group-specific signal. In some examples, the slot may be a first slot of a subframe. In other examples, the slot may be a second slot of a subframe. The operations of block 1804 may be performed according to the methods described herein. In certain examples, aspects of the operations of block 1804 may be performed by a duration component as described with reference to FIGS. 7 through 10.

At block 1805 the UE 115 may identify a channel duration for a modular channel. The channel duration may be identified based at least in part on the slot structure. In some cases, the modular channel may comprise time-frequency resources for a set of symbols within the slot. For example, depending on a number of uplink symbols designated for the slot structure of the slot, the channel duration may be longer (e.g., including 8 or 12 symbols) or shorter (e.g., including 2 or 4 symbols). The operations of block 1805 may be performed according to the methods described herein. In certain examples, aspects of the operations of block 1805 may be performed by a duration component as described with reference to FIGS. 7 through 10.

At block 1810 the UE 115 may determine, by a UE, a channel structure for the modular channel based at least in part on the channel duration. The operations of block 1810 may be performed according to the methods described herein. In certain examples, aspects of the operations of block 1810 may be performed by a channel structure component as described with reference to FIGS. 7 through 10.

At block 1815 the UE 115 may transmit, to a base station 105, an uplink message using the modular channel according to the channel structure. The operations of block 1815 may be performed according to the methods described herein. In certain examples, aspects of the operations of block 1815 may be performed by a uplink component as described with reference to FIGS. 7 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving a group-specific signal including slot structure information for a plurality of slots to be used in communications with a base station, wherein the slot structure information comprises information indicating a number of downlink and uplink symbols in each slot of the plurality of slots;
receiving a user equipment (UE)-specific signal including additional slot structure information for a first slot of the plurality of slots, the UE-specific signal being based at least in part on the slot structure information of the group-specific signal;
determining a first slot structure of the first slot based at least in part on the slot structure information of the group-specific signal and the additional slot structure information of the UE-specific signal and a second slot structure of a second slot of the plurality of slots based at least in part on the slot structure information of the group-specific signal; and
communicating with the base station using the first slot structure for the first slot and the second slot structure for the second slot.

2. The method of claim 1, wherein:
the second slot structure indicates multiple slot structures for respective slots subsequent to the first slot.

3. The method of claim 1, further comprising:
identifying a set of slot structure combinations available for use by a UE for the first slot and for a second slot, each combination having a downlink slot structure and an uplink slot structure; and
selecting, for the first slot and the second slot, one combination of the set of slot structure combinations.

4. The method of claim 3, wherein:
the one combination is selected based at least in part on a capability of the UE, an operation to be performed by the UE, an operational condition associated with the UE, or a combination thereof.

5. The method of claim 1, wherein:
the group-specific signal is a group-specific physical downlink control channel (PDCCH).

6. The method of claim 1, wherein:
the UE-specific signal is a UE-specific physical downlink control channel (PDCCH).

7. The method of claim 1, wherein:
the UE-specific signal is dynamically or semi-statically received.

8. The method of claim 1, wherein determining the first slot structure comprises:
determining a default slot structure for the first slot.

9. The method of claim 1, further comprising:
identifying a nominal slot structure for a sequence of slots, wherein each of the first slot structure for the first slot and the second slot structure for the second slot subsequent to the first slot is compatible with the nominal slot structure.

10. The method of claim 9, wherein:
each of the first slot structure and the second slot structure comprise an uplink portion, a downlink portion, and a guard period portion.

11. A method for wireless communication, comprising:
transmitting a group-specific signal including slot structure information for a plurality of slots to be used in communications with a user equipment (UE), wherein the slot structure information comprises information indicating a number of downlink and uplink symbols in each slot of the plurality of slots;
transmitting a UE-specific signal including additional slot structure information for a first slot of the plurality of slots, the UE-specific signal being based at least in part on the slot structure information of the group-specific signal; and
communicating with the UE using a first slot structure over the first slot and a second slot structure for a second slot, the first slot structure being based at least in part on the slot structure information included in the group-specific signal and the additional slot structure information included in the UE-specific signal, and the second slot structure being based at least in part on the slot structure information included in the group-specific signal.

12. The method of claim 11, wherein:
the UE-specific signal indicates a set of slot structure combinations available for use by the UE, wherein the second slot structure is based at least in part on the set of slot structure combinations.

13. The method of claim 12, wherein:
the second slot structure is based at least in part on a capability of the UE, an operation to be performed by the UE, an operational condition associated with the UE, or a combination thereof.

14. The method of claim 11, wherein:
the second slot structure indicates multiple slot structures for respective slots subsequent to the first slot.

15. The method of claim 11, further comprising:
determining a default slot structure for the first slot, wherein the group-specific signal indicates the default slot structure.

16. The method of claim 11, wherein:
the group-specific signal indicates the first slot structure for a set of UEs including the UE.

17. The method of claim 11, further comprising:
identifying a nominal slot structure for a sequence of slots, wherein each of the first slot structure for the first slot and the second slot structure for the second slot subsequent to the first slot is compatible with the nominal slot structure.

18. The method of claim 17, wherein:
each of the first slot structure and the second slot structure comprise an uplink portion, a downlink portion, and a guard period portion.

19. The method of claim 11, wherein:
the UE-specific signal is dynamically or semi-statically transmitted.

20. A method for wireless communication, comprising:
determining a slot structure for communicating with at least one user equipment (UE) during a slot, the slot structure being based at least on a group-specific signal and comprising a number of downlink and uplink symbols in the slot;
identifying a channel duration for a modular channel, the channel duration based at least in part on the slot structure, the modular channel comprising time-frequency resources for a set of symbols within the slot, the modular channel comprising a first channel of a set of channels and a second channel of the set of channels having an interval duration that is an integer multiple of an interval duration of the first channel;
determining, for the at least one UE, a channel structure for the modular channel based at least in part on the channel duration; and
transmitting, to the at least one UE, the group-specific signal and an indication of the channel structure.

21. The method of claim 20, wherein:
the slot structure is based at least on a UE-specific signal, and the method further comprising:
transmitting, to the at least one UE, the UE-specific signal.

22. The method of claim 20, further comprising:
multiplexing the set of channels in the slot based at least in part on the channel duration, wherein each channel of the set of channels corresponds to a respective UE, and wherein at least two channels of the set of channels are multiplexed across different physical resource blocks.

23. The method of claim 20, further comprising:
multiplexing the set of channels in the slot based at least in part on the channel duration, wherein each channel of the set of channels corresponds to a respective UE.

24. The method of claim 20, further comprising:
receiving, from the at least one UE, a channel message in accordance with the channel structure.

25. The method of claim 24, wherein:
the modular channel is a modular physical uplink control channel (PUCCH), the channel duration is a PUCCH duration, and the channel message is a PUCCH message.

26. The method of claim 24, wherein:
the modular channel is a modular physical uplink shared channel (PUSCH) for modular-based multiple user multiple-input/multiple-output (MU-MIMO) operation, the channel duration is a PUSCH duration, and the channel message is a PUSCH message.

27. A method for wireless communication, comprising:
receiving, by a user equipment (UE), a group-specific signal including slot structure information to be used in communications with a base station, wherein the slot structure information comprises information indicating a number of downlink and uplink symbols in a slot;
determining, by the UE, a slot structure for communicating with the base station during a slot, the slot structure being based at least on the group-specific signal;
identifying a channel duration for a modular channel, the channel duration being based at least in part on the slot structure, the modular channel comprising time-frequency resources for a set of symbols within the slot, the modular channel comprising a first channel of a set of channels and a second channel of the set of channels having an interval duration that is an integer multiple of an interval duration of the first channel;
determining, by the UE, a channel structure for the modular channel based at least in part on the channel duration; and
transmitting, to the base station, an uplink message using the modular channel according to the channel structure.

28. An apparatus for wireless communication, comprising:
a processor;
memory coupled to the processor; and
instructions stored in the memory and executable by the processor to cause the apparatus to:
receive a group-specific signal including slot structure information for a plurality of slots to be used in communications with a base station, wherein the slot structure information comprises information indicating a number of downlink and uplink symbols in each slot of the plurality of slots;
receive a user equipment (UE)-specific signal including additional slot structure information for a first slot of the plurality of slots, the UE-specific signal being based at least in part on the slot structure information of the group-specific signal;
determine a first slot structure of the first slot based at least in part on the slot structure information of the group-specific signal and the additional slot structure information of the UE-specific signal and a second slot structure for a second slot of the plurality of slots based at least in part on the slot structure information of the group-specific signal; and
communicate with the base station using the first slot structure for the first slot and the second slot structure for the second slot.

29. An apparatus for wireless communication, comprising:
a processor;
memory coupled to the processor; and
instructions stored in the memory and executable by the processor to cause the apparatus to:
transmit a group-specific signal including slot structure information for a plurality of slots to be used in communications with a user equipment (UE), wherein the slot structure information comprises information indicating a number of downlink and uplink symbols in each slot of the plurality of slots;

transmit a UE-specific signal including additional slot structure information for a first slot of the plurality of slots, the UE-specific signal being based at least in part on the slot structure information of the group-specific signal; and communicate with the UE using a first slot structure over the first slot and a second slot structure for a second slot of the plurality of slots, the first slot structure being based at least in part on the slot structure information included in the group-specific signal and the additional slot structure information included in the UE-specific signal, and the second slot structure being based at least in part on the slot structure information included in the group-specific signal.

30. An apparatus for wireless communication, comprising:

a processor;

memory coupled to the processor; and instructions stored in the memory and executable by the processor to cause the apparatus to:

determine a slot structure for communicating with at least one user equipment (UE) during a slot, the slot structure being based at least on a group-specific signal and comprising a number of downlink and uplink symbols in the slot;

identify a channel duration for a modular channel, the channel duration based at least in part on the slot structure, the modular channel comprising time-frequency resources for a set of symbols within the slot, the modular channel comprising a first channel of a set of channels and a second channel of the set of channels having an interval duration that is an integer multiple of an interval duration of the first channel;

determine, for the at least one UE, a channel structure for the modular channel based at least in part on the channel duration; and transmit, to the at least one UE, the group-specific signal and an indication of the channel structure.

31. An apparatus for wireless communication at a user equipment (UE), comprising:

a processor;

memory coupled to the processor; and instructions stored in the memory and executable by the processor to cause the apparatus to:

receive a group-specific signal including slot structure information to be used in communications with a base station, wherein the slot structure information comprises information indicating a number of downlink and uplink symbols in a slot;

determine a slot structure for communicating with the base station during a slot, the slot structure being based at least on the group-specific signal;

identify a channel duration for a modular channel, the channel duration being based at least in part on the slot structure, the modular channel comprising time-frequency resources for a set of symbols within the slot, the modular channel comprising a first channel of a set of channels and a second channel of the set of channels having an interval duration that is an integer multiple of an interval duration of the first channel;

determine a channel structure for the modular channel based at least in part on the channel duration; and transmit, to the base station, an uplink message using the modular channel according to the channel structure.

* * * * *